United States Patent
Sakurai et al.

(10) Patent No.: US 9,246,402 B2
(45) Date of Patent: Jan. 26, 2016

(54) CONVERTER AND SEMICONDUCTOR DEVICE

(71) Applicant: PANASONIC CORPORATION, Osaka (JP)

(72) Inventors: Tatsuya Sakurai, Osaka (JP); Takashi Saji, Shiga (JP); Tetsuyuki Fukushima, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 300 days.

(21) Appl. No.: 14/051,241

(22) Filed: Oct. 10, 2013

(65) Prior Publication Data

US 2014/0036561 A1   Feb. 6, 2014

Related U.S. Application Data

(63) Continuation of application No. PCT/JP2012/002162, filed on Mar. 28, 2012.

(30) Foreign Application Priority Data

Apr. 14, 2011 (JP) .................. 2011-090360

(51) Int. Cl.
| | |
|---|---|
| H02M 7/06 | (2006.01) |
| H02M 7/217 | (2006.01) |
| H02M 1/32 | (2007.01) |

(52) U.S. Cl.
CPC ............ *H02M 7/06* (2013.01); *H02M 7/217* (2013.01); *H02M 1/32* (2013.01); *H02M 2001/322* (2013.01)

(58) Field of Classification Search
CPC ......... H02M 7/06; H02M 7/062; H02M 7/12; H02M 7/125; H02M 7/155; H02M 7/1555; H02M 7/1557; H02M 7/217; H02M 7/219; H02M 2001/322; H02M 2007/2195; H02M 1/32; H02H 7/10; H02H 7/12; H02H 7/1216; H02H 7/125; H02H 7/1257

USPC ....................... 323/908; 307/43, 82
See application file for complete search history.

(56) References Cited

U.S. PATENT DOCUMENTS

| | | | |
|---|---|---|---|
| 6,088,243 A | 7/2000 | Shin | |
| 6,104,622 A | 8/2000 | Shin | |

(Continued)

FOREIGN PATENT DOCUMENTS

| | | |
|---|---|---|
| JP | 64-059513 A | 3/1989 |
| JP | 09-037562 A | 2/1997 |

(Continued)

OTHER PUBLICATIONS

International Search Report issued in PCT/JP2012/002162, dated Jun. 12, 2012.

*Primary Examiner* — Timothy J Dole
*Assistant Examiner* — Shahzeb K Ahmad
(74) *Attorney, Agent, or Firm* — McDermott Will & Emery LLP

(57) ABSTRACT

A converter includes: a bridge diode; an X capacitor provided upstream of the bridge diode; a smoothing capacitor provided downstream of the bridge diode; an AC shutoff detection circuit which outputs an AC shutoff detection signal when input AC voltage is shut off; and a discharging circuit which is connected to a connection point at which the cathode of the bridge diode and the smoothing capacitor are connected, and allows residual charges in the smoothing capacitor and the X capacitor to be discharged when the AC shutoff detection signal is output, and the discharging circuit includes a JFET which has a drain terminal connected to the above connection point and lowers discharge voltage; and a first discharging switch element connected to the source terminal of the JFET.

20 Claims, 26 Drawing Sheets

(56) References Cited

U.S. PATENT DOCUMENTS

| | | | |
|---|---|---|---|
| 6,430,062 B1 | 8/2002 | Shin | |
| 6,678,173 B2 | 1/2004 | Nakagawa | |
| 7,245,510 B2 * | 7/2007 | Baurle | H02M 3/33507 363/21.12 |
| 7,257,010 B2 * | 8/2007 | Takahashi | H02M 7/219 363/126 |
| 8,228,646 B2 * | 7/2012 | Chan | H02M 1/126 361/118 |
| 8,508,960 B2 * | 8/2013 | Chen | H02H 1/0007 361/58 |
| 8,901,782 B2 * | 12/2014 | Lee | H02M 1/32 307/326 |
| 2002/0118552 A1 | 8/2002 | Nakagawa | |
| 2003/0214819 A1 | 11/2003 | Nakagawa | |
| 2010/0309694 A1 * | 12/2010 | Huang | H02M 1/126 363/49 |

FOREIGN PATENT DOCUMENTS

| | | |
|---|---|---|
| JP | 11-235043 A | 8/1999 |
| JP | 2000-116027 A | 4/2000 |
| JP | 2000-184718 A | 6/2000 |
| JP | 2001-095261 A | 4/2001 |
| JP | 2006-204028 A | 8/2006 |
| JP | 4085853 B2 | 5/2008 |
| JP | 2010-004613 A | 1/2010 |
| JP | 4446136 B2 | 4/2010 |
| JP | 2011-067075 A | 3/2011 |

* cited by examiner

CONVERTER AND SEMICONDUCTOR DEVICE

CROSS REFERENCE TO RELATED APPLICATIONS

This is a continuation application of PCT International Application No. PCT/JP2012/002162 filed on Mar. 28, 2012, designating the United States of America, which is based on and claims priority of Japanese Patent Application No. 2011-090360 filed on Apr. 14, 2011. The entire disclosures of the above-identified applications, including the specifications, drawings and claims are incorporated herein by reference in their entirety.

FIELD

The present disclosure relates to converters and semiconductor devices which convert alternating current (AC) power to direct current (DC) power.

BACKGROUND

In converters represented by a power device which coverts input AC power to DC power and outputs a desired DC voltage, what is called an across-the-line capacitor (hereinafter referred to as X capacitor) that is a capacitor which reduces line noises is usually connected between AC voltage lines.

When a plug of the power device connected to the AC power supply is pulled out from a commercial power supply which is the AC power supply, electric charges accumulated until immediately before the pull-out remain in the X capacitor. At this time, there is a risk that these residual charges cause an electric shock to a person who touches an outlet portion of the plug just pulled out. There are safety standards for preventing such an electric shock, which demand that the X capacitor be discharged within a predetermined length of time when the AC power is shut off.

As a measure for this electric shock, a discharge resistor for allowing the residual charges to be discharged is conventionally provided in parallel with the X capacitor. However, this discharge resistor consumes power constantly while the power device is supplied with AC voltage. In particular, there is a problem that power consumed by the discharge resistor in the standby condition becomes too high to ignore.

In order to solve the above problem, Patent Literature (PTL) 1 discloses a power circuit which includes a transistor that switches the above discharge resistor between a conductive state and a non-conductive state and a control unit that controls the transistor between an ON state and an OFF state and in which, only when supplied with no AC voltage, the control unit turns on the transistor to form a discharging loop.

CITATION LIST

Patent Literature

[PTL 1] Japanese Unexamined Patent Application Publication No. 2006-204028

SUMMARY

Technical Problem

However, the power circuit disclosed by PTL 1 requires a large number of components in the control unit. In addition, the transistor, which is used as a switch element for discharge, is connected to a high-voltage AC power supply and therefore requires high-voltage properties, but a high-voltage element having such properties is costly. Consequently, it is difficult to reduce the cost and size of the power device while taking a measure for electric shocks.

Furthermore, in the power device, a smoothing capacitor for smoothing DC voltage resulting from conversion is connected between DC voltage lines. Also in this smoothing capacitor, there are accumulated residual charges when AC power is shut off, meaning that there is a risk that the residual charges in the smoothing capacitor cause an electric shock to a service engineer who may touch an internal circuit of the power device.

However, the power circuit disclosed by PTL 1 fails to take measures for electric shocks caused by the smoothing capacitor.

In order to solve the above conventional problems, non-limiting and exemplary embodiments have been provided with an aim to provide a converter and a semiconductor device which can be reduced in size and cost while taking a measure for electric shocks in the AC power shutoff state.

Solution to Problem

In order to solve the above problems, a converter according to an aspect of the present inventive concept converts input alternating current (AC) voltage to direct current (DC) voltage and comprises: a rectifier which has an anode terminal and a cathode terminal and rectifies the input AC voltage; an across-the-line capacitor provided upstream of the rectifier, for reducing a line noise; a smoothing capacitor which is provided downstream of the rectifier and smoothes rectified voltage resulting from the rectification by the rectifier; an AC shutoff detection circuit which outputs an AC shutoff detection signal when the input AC voltage being applied to an input terminal is shut off; and a discharging circuit which is connected to a first connection point, and allows residual charges in at least one of the smoothing capacitor and the across-the-line capacitor to be discharged when the AC shutoff detection signal is output from the AC shutoff detection circuit, the first connection point being a point at which the cathode terminal of the rectifier and the smoothing capacitor are connected, wherein the discharging circuit includes: a junction transistor which has a drain terminal connected to the first connection point and lowers discharge voltage that is voltage of the residual charges being discharged; and a first discharging switch which is connected to a source terminal of the junction transistor and allows the residual charges to be discharged, the source terminal being a terminal on a voltage drop side.

With this configuration, the junction transistor lowers, at the time of discharging, the voltage applied to the first connection point between the cathode terminal of the rectifier and the smoothing capacitor, meaning that no high-voltage element is required, but a low-voltage element is enough as the first discharging switch connected to the source terminal of the junction transistor. This facilitates the circuit designing and allows a reduction in size and element cost.

Furthermore, it may be that the rectifier half-wave rectifies the input AC voltage, and the AC shutoff detection circuit detects the input AC voltage half-wave rectified by the rectifier and outputs the AC shutoff detection signal when the input AC voltage being applied to the input terminal is shut off.

With this, a shutoff of input AC voltage can be detected even when the input AC voltage has been half-wave rectified, with the result that the diode provided upstream of the AC shutoff detection circuit is no longer needed. Accordingly, it is possible to reduce the required number of elements in the measure for electric shocks in the converter.

Furthermore, it may be that the converter comprises: a switch element which turns on and off terminal voltage of the smoothing capacitor; an input-output conversion unit configured to convert, to a desired DC voltage, the terminal voltage turned on or off by the switch element, and supply the DC voltage to a load; a control circuit which controls the turning on and off of the switch element; and a regulator which supplies power voltage to the control circuit, wherein the source terminal of the junction transistor is connected to the regulator.

With this, the junction transistor, which is originally provided for the purpose of an operation to supply electricity to the control circuit, is used also in a discharging operation executed by the discharging circuit. Accordingly, it is possible to reduce the required number of elements in the measure for electric shocks in the converter.

Furthermore, it may be that the first discharging switch has one end connected to the source terminal of the junction transistor and an other end connected to ground, and the discharging circuit is grounded to allow the residual charges to be discharged through the junction transistor and the first discharging switch in a path independent of a current path extending from the regulator to the control circuit.

With this, the discharging path that passes through the first discharging switch and the power supply path to the regulator are separated, so that electricity can be discharged at high speed without being affected by an operation of the control circuit.

Furthermore, it may be that the regulator includes the first discharging switch and supplies power to the control circuit through the first discharging switch, and the discharging circuit places the first discharging switch in a conductive state to allow the residual charges to be discharged.

With this, the first discharging switch incorporated in the regulator can effect both the charging path and the discharging path, which eliminates the need to provide another discharging switch element as the discharging circuit and leads to a size reduction and a reduced number of components.

Furthermore, the first discharging switch may be placed in the conductive state when a signal corresponding to the AC shutoff detection signal is applied to a gate of the first discharging switch.

With this, electricity can be discharged at high speed without being affected by an operation of the control circuit.

Furthermore, it may be that the control circuit places the switch element in a non-conductive state when the AC shutoff detection signal is input, and the first discharging switch is placed in the conductive state when the power voltage falls down to or below a reference voltage due to the non-conductive state of the switch element.

With this, residual charges are discharged when the control circuit places the switch element in a non-conductive state so that supplying electricity to power voltage of the control unit is stopped, followed by the first discharging switch being placed in a conductive state. Thus, the above discharging of residual charges makes it possible to prevent overvoltage which may be caused when excessive electricity is supplied to the power voltage.

Furthermore, it may be that the discharging circuit further includes a second discharging switch between a grounded terminal and a second connection point at which the first discharging switch and the control circuit are connected, the second discharging switch lowers the power voltage when placed in the conductive state by application of the AC shutoff detection signal to a gate of the second discharging switch, and the first discharging switch allows the residual charges to be discharged when placed in the conductive state by the lowering of the power voltage.

With this, the first discharging switch is placed in a conductive state, first, to lower the power voltage down to around the ground potential and after that, an operation to discharge residual charges starts. Thus, it is possible to prevent the overvoltage which is caused by this discharging operation when excessive electricity is supplied to the power voltage.

Furthermore, the converter may comprise a diode inserted in series between the first connection point and the smoothing capacitor where a forward direction is a direction from the first connection point toward the smoothing capacitor.

With this, the diode prevents residual charges in the smoothing capacitor from being discharged and enables discharging of residual charges in only the X capacitor when the discharging circuit executes a discharging operation.

Furthermore, the converter may comprise a resistor located between the first connection point and the smoothing capacitor and connected in parallel with the diode.

With this, it is possible that residual charges in the X capacitor are preferentially charged and residual charges in the smoothing capacitor are also discharged. Thus, electric shocks on an input terminal of the converter can be preferentially prevented, and electric shocks caused by touching a circuit inside the device can be prevented as well.

Furthermore, the converter may comprise a diode inserted in series between the cathode terminal of the rectifier and the first connection point where a forward direction is a direction from the cathode terminal of the rectifier toward the first connection point.

With this, it is possible to allow residual charges in both the smoothing capacitor and the X capacitor to be discharged when the discharging circuit executes a discharging operation.

Furthermore, the AC shutoff detection circuit may be connected to the first connection point.

This eliminates the need for the rectifying diode which is indispensable on the input side of the AC shutoff detection circuit when the AC shutoff detection circuit is connected to the AC voltage line. In addition, it is possible to protect the AC shutoff detection circuit from external surge voltage.

Furthermore, a converter according to an aspect of the present inventive concept converts input alternating current (AC) voltage to a desired direct current (DC) voltage and comprises: a rectifier which has a first anode terminal and a first cathode terminal and rectifies the input AC voltage; an across-the-line capacitor provided upstream of the rectifier, for reducing a line noise; a smoothing capacitor which is provided downstream of the rectifier and smoothes rectified voltage resulting from the rectification by the rectifier; an AC shutoff detection circuit which outputs an AC shutoff detection signal when the input AC voltage being applied to an input terminal is shut off; a diode having a second anode terminal and a second cathode terminal, the second anode terminal being connected to the first cathode terminal, the second cathode terminal being connected to the smoothing capacitor; a resistor connected in parallel with the diode; and a discharging circuit connected to a connection point between the first cathode terminal and the second anode terminal, and including a discharging switch which allows residual charges in the smoothing capacitor and the across-the-line capacitor to be discharged when the AC shutoff detection signal is output from the AC shutoff detection circuit.

With this, it is possible that residual charges in the X capacitor are preferentially charged and residual charges in the smoothing capacitor are also discharged. Thus, electric shocks on an input terminal of the converter can be preferentially prevented, and electric shocks caused by touching a circuit inside the device can be prevented as well.

Furthermore, it may be that the rectifier half-wave rectifies the input AC voltage, and the AC shutoff detection circuit detects the input AC voltage half-wave rectified by the rectifier and outputs the AC shutoff detection signal when the input AC voltage being applied to the input terminal is shut off.

With this, a shutoff of input AC voltage can be detected even when the input AC voltage has been half-wave rectified, with the result that the diode provided upstream of the AC shutoff detection circuit is no longer needed. Accordingly, it is possible to reduce the required number of elements in the measure for electric shocks in the converter.

Furthermore, it may be that the discharging circuit further includes a junction transistor which has a drain terminal connected to the connection point and lowers discharge voltage that is voltage of the residual charges being discharged, and the discharging switch is connected to a source terminal of the junction transistor and allows the residual charges to be discharged, the source terminal being a terminal on a voltage drop side.

With this configuration, the junction transistor lowers, at the time of discharging, the voltage applied to the connection point between the cathode terminal of the rectifier and the smoothing capacitor, meaning that no high-voltage element is required, but a low-voltage element is enough as the first discharging switch connected to the source of the junction transistor. This facilitates the circuit designing and allows a reduction in size and element cost.

Furthermore, the AC shutoff detection circuit may be connected to the connection point.

This eliminates the need for the rectifying diode which is indispensable on the input side of the AC shutoff detection circuit when the AC shutoff detection circuit is connected to the AC voltage line. In addition, it is possible to protect the AC shutoff detection circuit from external surge voltage.

Furthermore, it may be that the AC shutoff detection circuit includes: a voltage comparator which compares referential voltage and the input AC voltage half-wave rectified by the rectifier, the referential voltage being positive input; a pulse generation circuit which outputs, as a pulsed signal, a change in a signal received from the voltage comparator; and a timer circuit which causes the AC shutoff detection signal to be output only after a certain period of time has elapsed since the shutoff of the input AC voltage being applied.

With this, when the AC is shut off, the AC shutoff detection signal is output after a certain length of time.

Furthermore, the present disclosure can be implemented as a semiconductor device which is used in the converter. Specifically, a semiconductor device according to an aspect of the present inventive concept is provided in a converter including: a rectifier which has an anode terminal and a cathode terminal and rectifies input alternating current (AC) voltage; an across-the-line capacitor provided upstream of the rectifier; a smoothing capacitor provided downstream of the rectifier; a switch element which turns on and off terminal voltage of the smoothing capacitor; and an input-output conversion unit which converts, to a desired direct current (DC) voltage, the terminal voltage turned on or off by the switch element, and supplies the DC voltage to a load, the semiconductor device comprising: an AC shutoff detection circuit which outputs an AC shutoff detection signal when the input AC voltage being applied to an input terminal is shut off; a discharging circuit which is connected to a connection point between the cathode terminal of the rectifier and the smoothing capacitor, and allows residual charges in at least one of the smoothing capacitor and the across-the-line capacitor to be discharged when the AC shutoff detection signal is output from the AC shutoff detection circuit; a control circuit which controls the turning on and off of the switch element; and a regulator which supplies power voltage to the control circuit, wherein the discharging circuit includes: a junction transistor which lowers discharge voltage that is voltage of the residual charges being discharged; and a discharging switch which allows voltage resulting from the lowering by the junction transistor to be discharged, and a source terminal of the junction transistor is connected to the regulator, the source terminal being a terminal on a voltage drop side.

With this configuration, the junction transistor lowers, at the time of discharging, the voltage applied to the connection point between the cathode terminal of the rectifier and the smoothing capacitor, meaning that no high-voltage element is required, but a low-voltage element is enough as the first discharging switch connected to the source terminal of the junction transistor. This facilitates the circuit designing and allows a reduction in size and element cost.

Furthermore, a semiconductor device according to an aspect of the present inventive concept is provided in a converter including: a rectifier which has an anode terminal and a cathode terminal and rectifies input alternating current (AC) voltage; an across-the-line capacitor provided upstream of the rectifier; a rectifying element having an anode terminal and a cathode terminal; a smoothing capacitor provided downstream of the rectifier; a switch element which turns on and off terminal voltage of the smoothing capacitor; and an input-output conversion unit which converts, to a desired direct current (DC) voltage, the terminal voltage turned on or off by the switch element, and supplies the DC voltage to a load, the semiconductor device comprising: an AC shutoff detection circuit which detects the input AC voltage half-wave rectified by the rectifier and outputs an AC shutoff detection signal when the input AC voltage being applied to an input terminal is shut off; a discharging circuit which is connected to the cathode terminal of the rectifying element, and allows residual charges in at least one of the smoothing capacitor and the across-the-line capacitor to be discharged through the rectifying element when the AC shutoff detection signal is output from the AC shutoff detection circuit; a control circuit which controls the turning on and off of the switch element; and a regulator which supplies power voltage to the control circuit, wherein the discharging circuit includes: a junction transistor which lowers discharge voltage that is voltage of the residual charges being discharged; and a discharging switch which allows voltage resulting from the lowering by the junction transistor to be discharged, a source terminal of the junction transistor is connected to the regulator, the source terminal being a terminal on a voltage drop side, and the AC shutoff detection circuit includes: a voltage comparator which compares referential voltage and the input AC voltage half-wave rectified by the rectifier, the referential voltage being positive input; a pulse generation circuit which outputs, as a pulsed signal, a change in a signal received from the voltage comparator; and a timer circuit which causes the AC shutoff detection signal to be output only after a certain period of time has elapsed since the shutoff of the input AC voltage being applied.

Furthermore, a converter according to an aspect of the present inventive concept converts input alternating current (AC) voltage to direct current (DC) voltage and comprises: a rectifier which has an anode terminal and a cathode terminal and rectifies the input AC voltage; a rectifying element connected upstream of the rectifier and having an anode terminal and a cathode terminal; an across-the-line capacitor provided upstream of the rectifier, for reducing a line noise; a smoothing capacitor which is provided downstream of the rectifier and smoothes rectified voltage resulting from the rectification by the rectifier; an AC shutoff detection circuit which is connected upstream of the rectifier, and detects the input AC voltage half-wave rectified by the rectifier and outputs an AC shutoff detection signal when the input AC voltage being applied to an input terminal is shut off; and a discharging circuit which allows residual charges in the across-the-line capacitor to be discharged through the rectifying element when the AC shutoff detection signal is output from the AC shutoff detection circuit, wherein the discharging circuit includes: a junction transistor which is connected to the cathode terminal of the rectifying element and lowers discharge voltage that is voltage of the residual charges being discharged; and a first discharging switch which is connected to a source terminal of the junction transistor and allows the residual charges to be discharged through the rectifying element, the source terminal being a terminal on a voltage drop side.

With this, as compared to the circuit in which the discharging circuit is connected downstream of the rectifier, there is availability even in the case of high power output, and both the cost increase and the increase in mounting area can be minimized.

Furthermore, the converter may further comprise a resistor connected between a drain terminal of the joint transistor and a first connection point at which the cathode terminal of the rectifier and the smoothing capacitor are connected.

With this, it is possible that residual charges in the across-the-line capacitor are preferentially charged and residual charges in the smoothing capacitor are also discharged.

Furthermore, a converter according to an aspect of the present inventive concept converts input alternating current (AC) voltage to direct current (DC) voltage and comprises: a rectifier which has an anode terminal and a cathode terminal and rectifies the input AC voltage; a rectifying element connected upstream of the rectifier; an across-the-line capacitor provided upstream of the rectifier, for reducing a line noise; a smoothing capacitor which is provided downstream of the rectifier and smoothes rectified voltage resulting from the rectification by the rectifier; an AC shutoff detection circuit which is connected upstream of the rectifier, and detects the input AC voltage half-wave rectified by the rectifier and outputs an AC shutoff detection signal when the input AC voltage being applied to an input terminal is shut off; a discharging circuit which allows residual charges in both the smoothing capacitor and the across-the-line capacitor to be discharged through the rectifying element when the AC shutoff detection signal is output from the AC shutoff detection circuit; and a resistor serving as a discharging path for the residual charges in the smoothing capacitor, wherein the discharging circuit includes: a junction transistor which has a drain terminal connected to a first connection point and lowers discharge voltage that is voltage of the residual charges being discharged, the first connection point being a point at which the cathode terminal of the rectifier and the smoothing capacitor are connected; and a first discharging switch which is connected to a source terminal of the junction transistor and allows the residual charges to be discharged, the source terminal being a terminal on a voltage drop side, and the resistor is inserted in series between the drain terminal of the junction transistor and the first connection point.

Furthermore, a semiconductor device according to an aspect of the present inventive concept is provided in a converter including: a rectifier which has an anode terminal and a cathode terminal and rectifies input alternating current (AC) voltage; an across-the-line capacitor provided upstream of the rectifier; a smoothing capacitor provided downstream of the rectifier; a switch element which turns on and off terminal voltage of the smoothing capacitor; and an input-output conversion unit which converts, to a desired direct current (DC) voltage, the terminal voltage turned on or off by the switch element, and supplies the DC voltage to a load, the semiconductor device comprising: an AC shutoff detection circuit which detects the input AC voltage half-wave rectified by the rectifier and outputs an AC shutoff detection signal when the input AC voltage being applied to an input terminal is shut off; a discharging circuit which is connected to a connection point between the cathode terminal of the rectifier and the smoothing capacitor, and allows residual charges in at least one of the smoothing capacitor and the across-the-line capacitor to be discharged when the AC shutoff detection signal is output from the AC shutoff detection circuit; a control circuit which controls the turning on and off of the switch element; and a regulator which supplies power voltage to the control circuit, wherein the discharging circuit includes: a junction transistor which lowers discharge voltage that is voltage of the residual charges being discharged; and a discharging switch which allows voltage resulting from the lowering by the junction transistor to be discharged, and a source terminal of the junction transistor is connected to the regulator, the source terminal being a terminal on a voltage drop side.

Furthermore, a semiconductor device according to an aspect of the present inventive concept is provided in a converter including: a rectifier which has an anode terminal and a cathode terminal and rectifies input alternating current (AC) voltage; an across-the-line capacitor provided upstream of the rectifier; a smoothing capacitor provided downstream of the rectifier; a switch element which turns on and off terminal voltage of the smoothing capacitor; and an input-output conversion unit which converts, to a desired direct current (DC) voltage, the terminal voltage turned on or off by the switch element, and supplies the DC voltage to a load, the semiconductor device comprising: an AC shutoff detection circuit which detects the input AC voltage half-wave rectified by the rectifier and outputs an AC shutoff detection signal when the input AC voltage being applied to an input terminal is shut off; a discharging circuit which is connected to the cathode terminal of the rectifier, and allows residual charges in at least one of the smoothing capacitor and the across-the-line capacitor to be discharged when the AC shutoff detection signal is output from the AC shutoff detection circuit; a control circuit which controls the turning on and off of the switch element; and a regulator which supplies power voltage to the control circuit, wherein the discharging circuit includes: a junction transistor which lowers discharge voltage that is voltage of the residual charges being discharged; and a discharging switch which allows voltage resulting from the lowering by the junction transistor to be discharged, a source terminal of the junction transistor is connected to the regulator, the source terminal being a terminal on a voltage drop side, and the AC shutoff detection circuit includes: a voltage comparator which compares referential voltage and the input AC voltage half-wave rectified by the rectifier, the referential voltage being positive input; a pulse generation circuit which outputs, as a pulsed signal, a change in a signal received from the voltage comparator; and a timer circuit which causes the AC shutoff detection signal to be output only after a certain period of time has elapsed since the shutoff of the input AC voltage being applied.

Advantageous Effects

A converter and a semiconductor device in the present disclosure are each capable of allowing residual charges in a capacitor to be discharged, without using a high-voltage element as a discharging switch element, and therefore allow a reduction in size and cost while taking measures for electric shocks in the AC power shutoff state.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a circuit diagram showing a configuration example of a converter according to Embodiment 1.
FIG. 2 is a circuit diagram of a converter according to Variation 1 of Embodiment 1.
FIG. 3 is a specific circuit diagram of the converter according to Variation 1 of Embodiment 1.
[FIG. 4]
FIG. 4B is a specific circuit diagram of a converter according to Variation 3 of Embodiment 1.
FIG. 4C is a specific circuit diagram of a converter according to Variation 4 of Embodiment 1.
FIG. 5 is a specific circuit diagram of a converter according to Embodiment 2.
FIG. 6 is a specific circuit diagram of a converter according to Embodiment 3.
FIG. 7 is a specific circuit diagram of a converter according to Embodiment 4.
FIG. 8 is a chart for explaining comparison between the discharging operations of the converters according to Embodiments 1 to 4.
FIG. 9 is a circuit diagram showing a configuration example of a converter according to Embodiment 5.
FIG. 10 is a circuit diagram showing a configuration example of a converter according to Variation 1 of Embodiment 5.
FIG. 11A is a circuit diagram showing a configuration example of a converter according to Variation 2 of Embodiment 5.
FIG. 11B is a specific circuit diagram of the converter according to Variation 2 of Embodiment 5.
FIG. 11C is a timing chart showing operations of an AC shutoff detection circuit.
FIG. 12 is a circuit diagram showing a configuration example of a converter according to Variation 3 of Embodiment 5.
FIG. 13 is a circuit diagram showing a configuration example of a converter according to Embodiment 6.
FIG. 14 is a circuit diagram showing a configuration example of a converter according to Variation of Embodiment 6.
[FIG. 15]
FIG. 15B is a specific circuit diagram of the converter according to Embodiment 7.
FIG. 15C is a timing chart showing operations of an AC shutoff detection circuit.
FIG. 16 is a circuit diagram showing a configuration example of a converter according to Embodiment 8.
FIG. 17 is a circuit diagram showing a configuration example of a converter according to Variation 1 of Embodiment 8.
FIG. 18 is a circuit diagram showing a configuration example of a converter according to Variation 2 of Embodiment 8.
FIG. 19 is a specific circuit diagram of a converter according to Embodiment 9.
FIG. 20 is a circuit diagram showing a configuration example of a converter according to Variation of Embodiment 9.

DESCRIPTION OF EMBODIMENTS

Switching power devices and semiconductor devices according to embodiments shall be described below with reference to the drawings. It is to be noted that in the following embodiments, a drain terminal, a source terminal, a gate terminal, an anode terminal, and a cathode terminal may be referred to simply as a drain, a source, a gate, an anode, and a cathode, respectively.

(Embodiment 1)

A converter according to Embodiment 1 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 1 further includes: a switch element which turns on and off terminal voltage of the smoothing capacitor; an input-output conversion unit which converts, to a desired DC voltage, the terminal voltage turned on or off by the switch element, and supplies the DC voltage to a load; a control circuit which controls the turning on and off of the switch element; and a regulator which supplies power voltage to the control circuit, wherein the source terminal of the junction transistor is connected to the regulator.

Specifically, in the converter according to Embodiment 1, the first discharging switch has one end connected to the source terminal of the junction transistor and the other end connected to ground, and the discharging circuit is grounded to allow residual charges to be discharged through the junction transistor and the first discharging switch in a path independent of the current path extending from the regulator to the control circuit.

Figure 1:
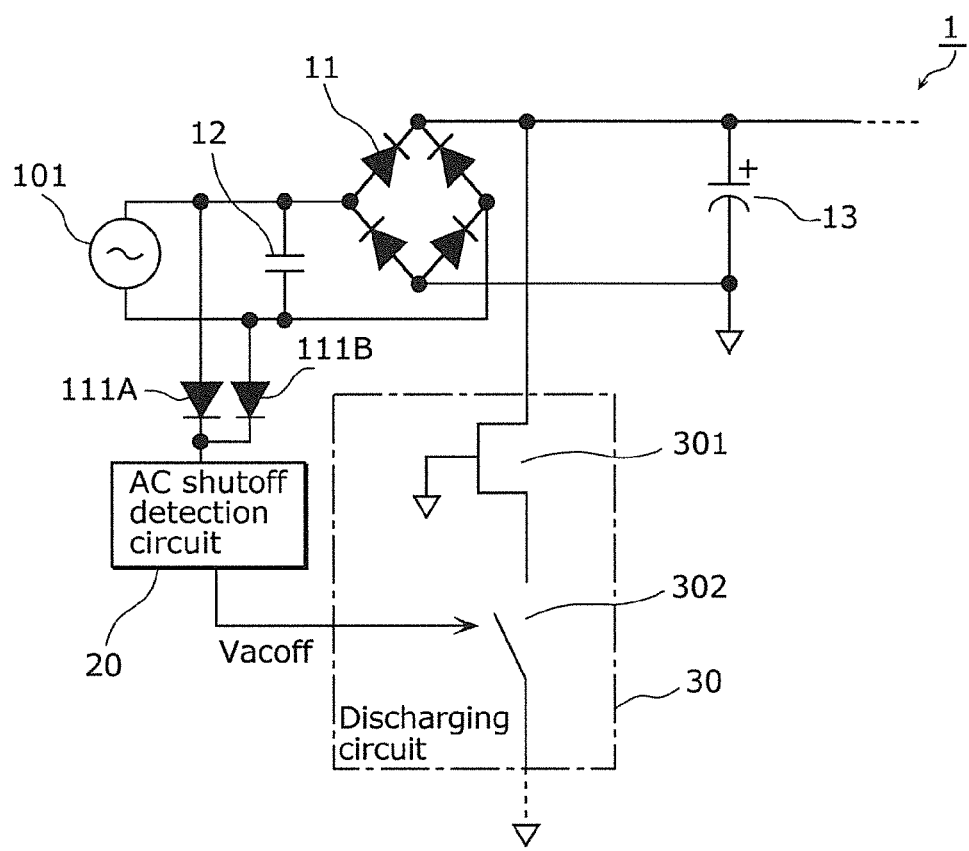
[FIG. 1]

FIG. 1 is a circuit diagram showing a configuration example of the converter according to Embodiment 1. The converter 1 shown in this figure includes a bridge diode 11, an across-the-line capacitor 12 (hereinafter referred to as an X capacitor), a smoothing capacitor 13, an AC shutoff detection circuit 20, a discharging circuit 30, and diodes 111A and 111B.

The bridge diode 11 is a rectifier which has an anode terminal and a cathode terminal, is connected to an external AC power supply 101, and has a function of rectifying input AC voltage provided from the AC power supply 101. The bridge diode 11 includes four diodes, for example, where the cathodes of first and second diodes are connected to each other at a first connection point, the anodes of third and fourth diodes are connected to each other at a second connection point, the anode of the first diode and the cathode of the third diode are connected to each other at a third connection point, and the anode of the second diode and the cathode of the fourth diode are connected to each other at a fourth connection point. In this connection configuration, the third and fourth connection points are connected to two input terminals of the converter 1. These two input terminals are connected to the AC power supply 101, and a line which connects the third connection point and one of the input terminals and a line which connects the fourth connection point and the other of the input terminals form an AC voltage line. The first connection point is the cathode of the bridge diode 11, and the second connection point is the anode of the bridge diode 11.

The X capacitor 12 is provided upstream of the bridge diode 11 and has a function of reducing line noises. The electrodes of the X capacitor 12 are both connected to the above AC voltage line.

The smoothing capacitor 13 is provided downstream of the bridge diode 11 and has a function of smoothing rectified voltage resulting from the rectification by the bridge diode 11. The electrodes of the smoothing capacitor 13 are respectively connected to the first connection point, i.e., the cathode, of the bridge diode 11 and the second connection point, i.e., the anode, of the bridge diode 11. A line which connects one of the electrodes of the smoothing capacitor 13 and the cathode of the bridge diode 11 and a line which connects the other of the electrodes of the smoothing capacitor 13 and the anode of the bridge diode 11 form a DC voltage line.

The AC shutoff detection circuit 20 is connected to the AC voltage line via the diodes 111A and 111B. The diodes 111A and 111B rectify the input AC voltage and output the resultant input AC voltage to the AC shutoff detection circuit 20. By doing so, the AC shutoff detection circuit 20 detects a change in DC voltage, thereby being capable of detecting that the input AC voltage has been shutoff. The AC shutoff detection circuit 20 detects that the AC power supply 101 and the converter 1 have become non-conductive, that is, that the input AC voltage has been shutoff, and at this time, the AC shutoff detection circuit 20 outputs an AC shutoff detection signal Vacoff. It is to be noted that the AC shutoff detection circuit 20 shown in FIG. 1 is a circuit which detects a shutoff of full-wave rectified AC voltage, but may be a circuit which detects a shutoff of half-wave rectified AC voltage. In addition, the AC shutoff detection circuit 20 shown in FIG. 1 is connected to the AC voltage line, but may be connected to the DC voltage line. In this case, the diodes 111A and 111B are not necessary. A configuration of the AC shutoff detection circuit 20 connected to the DC voltage line will be described in Embodiment 5. A configuration of the AC shutoff detection circuit which detects a shutoff of half-wave rectified AC voltage will be described in Embodiment 7.

The discharging circuit 30 has an input terminal connected to the connection point between the cathode of the bridge diode 11 and the smoothing capacitor 13 and has a function of allowing residual charges in at least one of the smoothing capacitor 13 and the X capacitor 12 to be discharged when the AC shutoff detection signal Vacoff is output from the AC shutoff detection circuit 20. The discharging circuit 30 includes a junction transistor (hereinafter referred to as JFET) 301 and a discharging switch element 302. The JFET 301 has a drain connected to the above connection point, a source connected to one of the terminals of the discharging switch element 302, and a gate connected to ground. With this connection configuration, the JFET 301 is capable of allowing current to constantly flow between the source and the drain thereof and has a function of lowering discharge voltage that is voltage of the residual charges being discharged. Furthermore, the JFET 301 is small in size and suitable for space-saving and a reduction in thickness. The discharging switch element 302 is a first discharging switch having a function of allowing residual charges to be discharged, with the voltage applied thereto which results from the lowering of voltage by the JFET 301.

Figure 2:
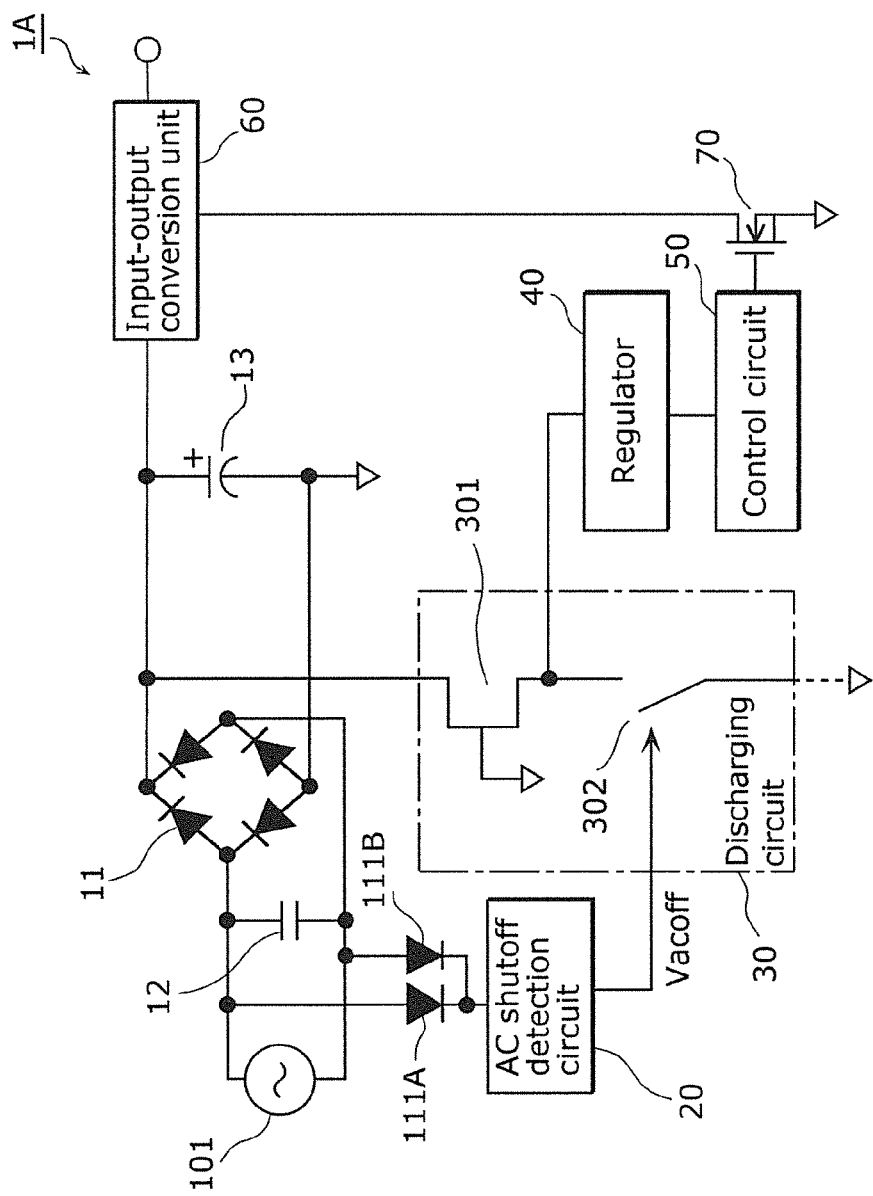
[FIG. 2]

FIG. 2 is a circuit diagram showing a configuration example of a converter according to Variation 1 of Embodiment 1. A converter 1A shown in FIG. 2 includes, in addition to the structural elements included in the converter 1 shown in FIG. 1, a regulator 40, a control circuit 50, an input-output conversion unit 60, and a switch element 70.

The regulator 40 is a power-supply circuit connected to the connection point between the source of the JFET 301 and the discharging switch element 302. The regulator 40 has an internal switch which is turned on at a start-up of the converter 1A or when the control circuit 50 needs power, to control power supply to the control circuit 50 so that out of the power received from the JFET 301, only the necessary amount of power for the control circuit 50 is supplied.

The control circuit 50 is connected to the regulator 40 and the switch element 70 and has a function of controlling the switch element 70 with the use of power supplied from the regulator 40.

In the converter 1A, the JFET 301 is provided originally for the purpose of power supply to the control circuit 50, but is used as well for the discharging operation of the discharging circuit 30 in this embodiment. Accordingly, it is possible to reduce the required number of elements in the measure for electric shocks in the converter.

Next, an operation of the converter 1A is described.

First, the AC shutoff detection circuit 20 generates the AC shutoff detection signal Vacoff when detecting that the AC power supply 101 has been shutoff. The AC shutoff detection signal Vacoff is input to the discharging circuit 30, and according to this signal, the discharging switch element 302 becomes conductive.

Next, when the discharging switch element 302 is conductive, residual charges in the X capacitor 12 and the smoothing capacitor 13 are discharged through the JFET 301 and the discharging switch element 302.

With this configuration, the JFET 301 lowers, at the time of discharging, the voltage applied to the connection point between the cathode of the bridge diode 11 and the smoothing capacitor 13, meaning that no high-voltage element is required, but a low-voltage element is enough as the discharging switch element 302 connected to the source of the JFET 301. This facilitates the circuit designing and allows a reduction in size and element cost. Here, the high-voltage element indicates an element having a withstanding voltage of 100 V or more, and the low-voltage element indicates an element having a withstanding voltage less than 100 V.

Figure 3:
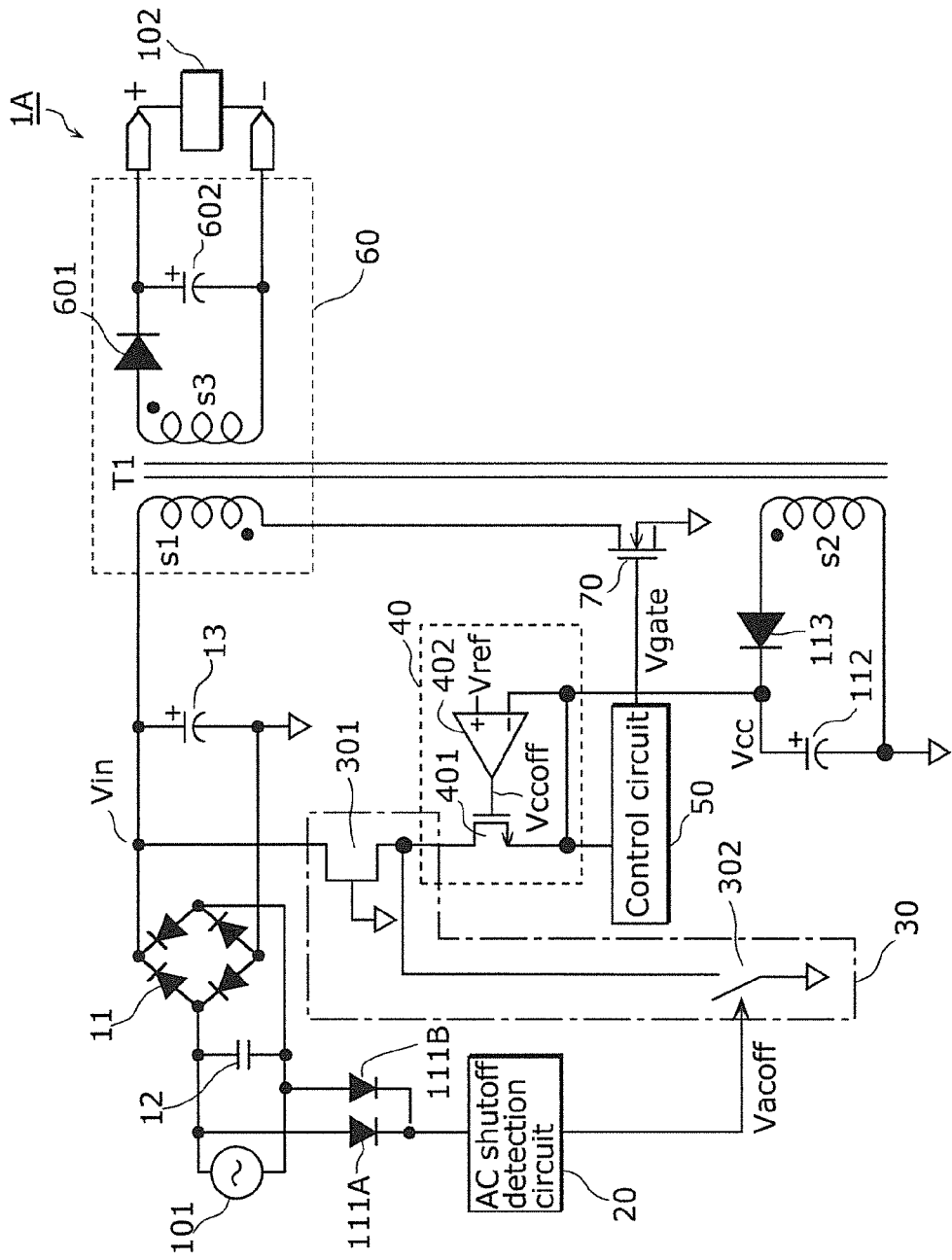
[FIG. 3]

FIG. 3 is a specific circuit diagram of the converter according to Variation 1 of Embodiment 1. In the converter 1A shown in FIG. 3, the regulator 40 and the input-output conversion unit 60 in the converter 1A shown in FIG. 2 are specifically represented in form of circuit configurations.

The regulator 40 includes a switch element 401 and a voltage comparator 402. When power voltage Vcc in the control circuit 50 and an internal circuit falls below referential voltage Vref that is positive input of the voltage comparator 402, the voltage comparator 402 generates a Vccoff signal and makes the switch element 401 conductive. By doing so, the power voltage Vcc increases because voltage is supplied from the DC voltage line through the JFET 301. When the power voltage Vcc reaches the same level as the referential voltage Vref, the voltage comparator 402 stops generating the Vccoff signal. Thus, the regulator 40 controls the supply of power to the control circuit 50 and the internal circuit independently of the discharging operation of the discharging circuit 30.

Meanwhile, the discharging switch element 302 is grounded, and the discharging circuit 30 is grounded to allow residual charges in the X capacitor 12 and the smoothing capacitor 13 to be discharged through the JFET 301 and the discharging switch element 302 in a path independent of the power supply path extending from the regulator 40 to the control circuit 50.

The input-output conversion unit 60 includes a transformer T1, a diode 601, and a smoothing capacitor 602. A transformer winding 51 has one end connected to the positive electrode of the smoothing capacitor 13 and the other end connected to one end of the switch element 70. A transformer winding s2 has one end connected to the anode of the diode 113 for generating power voltage Vcc and the other end connected to ground. The cathode of the diode 113 is connected to the positive electrode of a smoothing capacitor 112 for generating power voltage Vcc. The negative electrode of the smoothing capacitor 112 is grounded. The positive electrode of the smoothing capacitor 112 is connected to the negative-input terminal of the voltage comparator 402. With this, the switch element 70 executes an on-off operation according to a Vgate signal generated by the control circuit 50 and transfers a desired DC voltage to a secondary circuit, i.e., a load 102, via a winding s3 of the transformer T1.

With this configuration, the discharging path that passes through the discharging switch element 302 and the power-supplying path to the regulator 40 are separated, so that electricity can be discharged at high speed without being affected by an operation of the control circuit 50.

The following describes an input-output conversion unit which has a structure different from the structure of the above-described input-output conversion unit 60.

In the above Embodiment 1, the flyback converter which uses a transformer for the input-output conversion unit 60 has been described. In this regard, the input-output conversion unit may be a voltage-dropping chopper circuit, a polarity-reversal chopper circuit, or a voltage-increasing chopper circuit.

First, an example of the voltage-dropping chopper circuit is described.

Figure 4A:
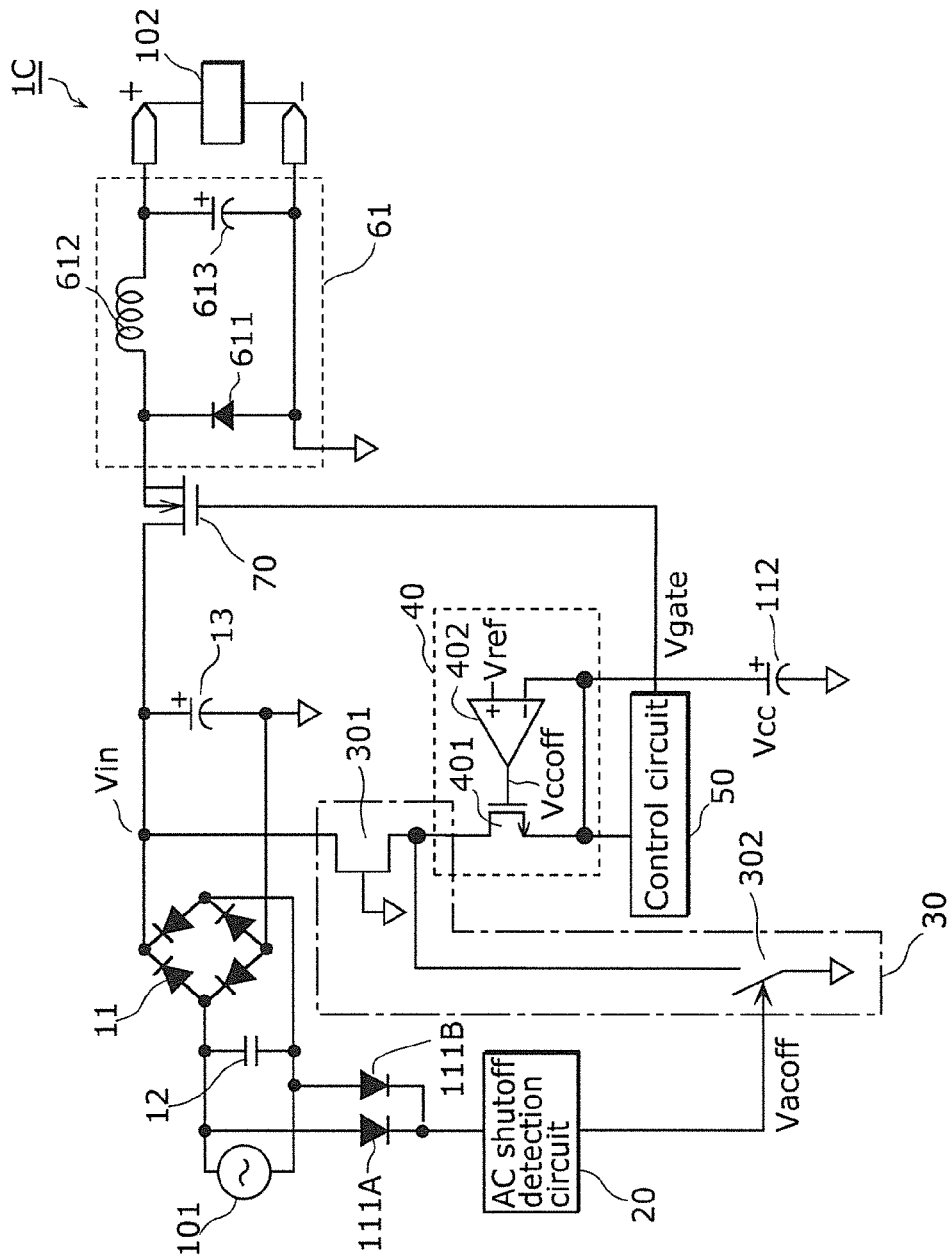
FIG. 4A is a specific circuit diagram of a converter according to Variation 2 of Embodiment 1.

FIG. 4A is a specific circuit diagram of a converter according to Variation 2 of Embodiment 1. A converter 1C shown in FIG. 4A is different from the converter 1A shown in FIG. 3 in that an input-output conversion unit 61 is provided instead of the input-output conversion unit 60. The same structural elements as those in the converter 1A shown in FIG. 3 are denoted with the same reference numerals, and descriptions thereof are omitted to mainly describe differences below.

The input-output conversion unit 61 converts, to output voltage, input voltage received as a result of switching by the switch element 70, and supplies output power to the load 102 connected to the output terminal thereof. As shown in FIG. 4A, the input-output conversion unit 61 includes a coil 612, a diode 611, and a capacitor 613.

The coil 612 is an example of an energy transfer element and is connected between the positive-electrode-side input terminal and the positive-electrode-side output terminal in the input-output conversion unit 61. The coil 612 converts, to AC output voltage, input voltage received as a result of switching by the switch element 70.

The diode 611 is an example of a rectifying element and has an anode connected to the negative-electrode-side input terminal and the negative-electrode-side output terminal in the input-output conversion unit 61 and a cathode connected to the connection point between the switch element 70 and the coil 612. The diode 611 rectifies the AC output voltage generated by the coil 612.

The capacitor 613 is an example of a smoothing capacitive element and has one end connected to the connection point between the coil 612 and the positive-electrode-side output terminal in the input-output conversion unit 61 and the other end connected to the negative-electrode-side input terminal and the negative-electrode-side output terminal in the input-output conversion unit 61. The capacitor 613 smoothes the AC output voltage generated by the coil 612.

With the above configuration, the converter 1C according to this Variation generates DC output voltage at the output terminal thereof by using the switch element 70 switching DC input voltage. At this time, the input-output conversion unit 61 generates output voltage lower than input voltage since the input-output conversion unit 61 is a voltage-dropping chopper circuit as shown in FIG. 4A.

Next, an example of the polarity-reversal chopper circuit is described.

Figure 4B:
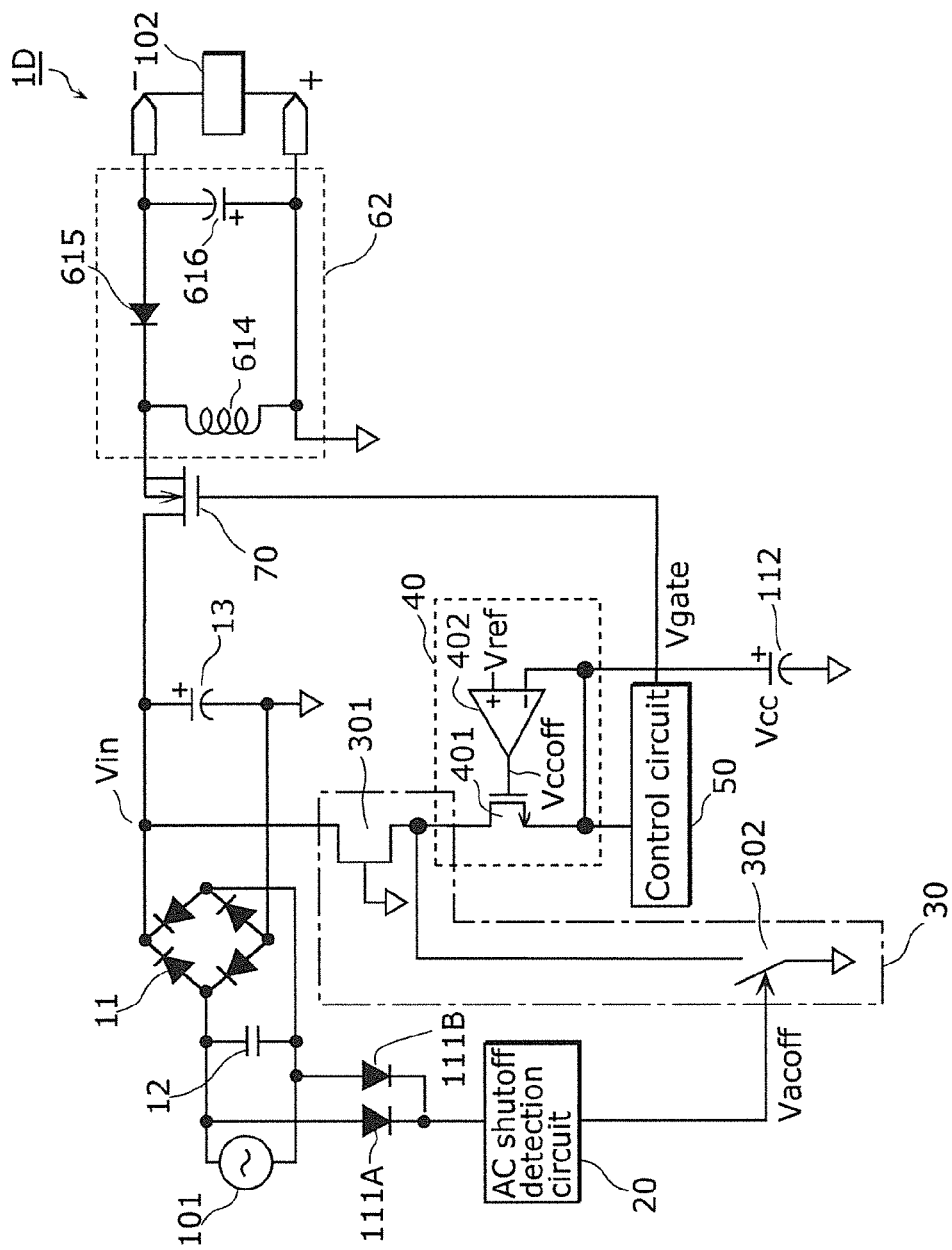
[FIG. 4B]

FIG. 4B is a specific circuit diagram of a converter according to Variation 3 of Embodiment 1. A converter 1D shown in FIG. 4B is different from the converter 1A shown in FIG. 3 in that an input-output conversion unit 62 is provided instead of the input-output conversion unit 60. The same structural elements as those in the converter 1A shown in FIG. 3 are denoted with the same reference numerals, and descriptions thereof are omitted to mainly describe differences below.

The input-output conversion unit 62 converts, to output voltage, input voltage received as a result of switching by the switch element 70, and supplies output power to the load 102 connected to the output terminal thereof. As shown in FIG. 4B, the input-output conversion unit 62 includes a coil 614, a diode 615, and a capacitor 616.

The coil 614 is an example of the energy transfer element and is connected between (i) the connection point between the switch element 70 and the cathode of the diode 615 and (ii) the connection point between the negative-electrode-side input terminal and the positive-electrode-side output terminal in the input-output conversion unit 62. The coil 614 converts, to AC output voltage, input voltage received as a result of switching by the switch element 70.

The diode 615 is an example of the rectifying element and has an anode connected to the negative-electrode-side output terminal of the input-output conversion unit 62 and a cathode connected to the connection point between the switch element 70 and the coil 614. The diode 615 rectifies the AC output voltage generated by the coil 614.

The capacitor 616 is an example of the smoothing capacitive element and has one end connected to the connection point between the anode of the diode 615 and the negative-electrode-side output terminal of the input-output conversion unit 62 and the other end connected to the connection point between the coil 614 and the positive-electrode-side output terminal of the input-output conversion unit 62. The capacitor 616 smoothes the AC output voltage generated by the coil 614.

With the above configuration, the converter 1D according to this Variation generates DC output voltage at the output terminal thereof by using the switch element 70 switching DC input voltage. At this time, the input-output conversion unit 62 generates output voltage with a polarity opposite to the polarity of input voltage since the input-output conversion unit 62 is a polarity-reversal chopper circuit as shown in FIG. 4B.

Subsequently, an example of the voltage-increasing chopper circuit is described.

Figure 4C:
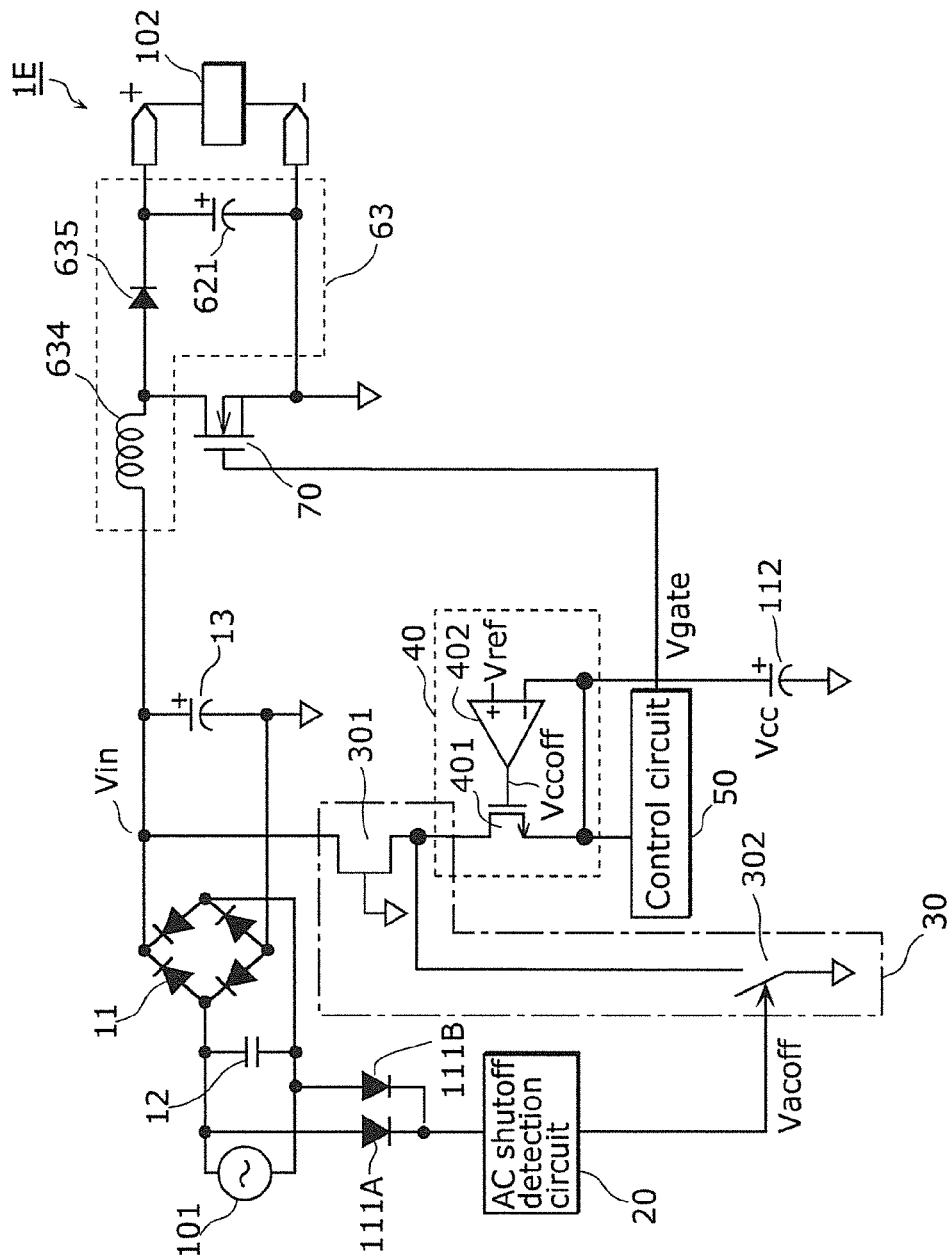
[FIG. 4C]

FIG. 4C is a specific circuit diagram of a converter according to Variation 4 of Embodiment 1. A converter 1E shown in FIG. 4C is different from the converter 1A shown in FIG. 3 in that an input-output conversion unit 63 is provided instead of the input-output conversion unit 60. The same structural elements as those in the converter 1A shown in FIG. 3 are denoted with the same reference numerals, and descriptions thereof are omitted to mainly describe differences below.

The input-output conversion unit 63 converts, to output voltage, input voltage received as a result of switching by the switch element 70, and provides output power to the load 102 connected to the output terminal thereof. As shown in FIG. 4C, the input-output conversion unit 63 includes a coil 634, a diode 635, and a capacitor 621.

The coil 634 is an example of the energy transfer element and is connected between the switch element 70 and the input terminal of the input-output conversion unit 63. The coil 634 converts, to AC output voltage, input voltage received as a result of switching by the switch element 70.

The diode 635 is an example of the rectifying element and has an anode connected to the connection pint between the switch element 70 and the coil 634 and a cathode connected to one end of the capacitor 621 and the positive-electrode-side output terminal of the input-output conversion unit 63. The diode 635 rectifies the AC output voltage generated by the coil 634.

The capacitor 621 is an example of the smoothing capacitive element and has one end connected to the connection point between the cathode of the diode 635 and the positive-electrode-side output terminal of the input-output conversion unit 63 and the other end connected to the negative-electrode-side input terminal and the negative-electrode-side output terminal in the input-output conversion unit 63. The capacitor 621 smoothes the AC output voltage generated by the coil 634.

With the above configuration, the converter 1E according to this Variation generates DC output voltage at the output terminal thereof by using the switch element 70 switching DC input voltage. At this time, the input-output conversion unit 63 generates output voltage higher than input voltage since the input-output conversion unit 63 is a voltage-increasing chopper circuit as shown in FIG. 4C.

It is to be noted that the AC shutoff detection circuit 20 described in this embodiment only needs to be able to detect an AC shutoff even with residual charges in the X capacitor 12.

(Embodiment 2)

A converter according to Embodiment 2 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 2 further includes: a switch element which turns on and off terminal voltage of the smoothing capacitor; an input-output conversion unit which converts, to a desired DC voltage, the terminal voltage turned on or off by the switch element, and supplies the DC voltage to a load; a control circuit which controls the turning on and off of the switch element; and a regulator which supplies power voltage to the control circuit, wherein the source terminal of the junction transistor is connected to the regulator.

The regulator according to Embodiment 2 includes a first discharging switch and supplies power to the control circuit through the first discharging switch, and the discharging circuit places the first discharging switch in a conductive state to allow residual charges to be discharged. Here, the first discharging switch is placed in a conductive state when a signal corresponding to the AC shutoff detection signal is applied to the gate of the first discharging switch.

Figure 5:
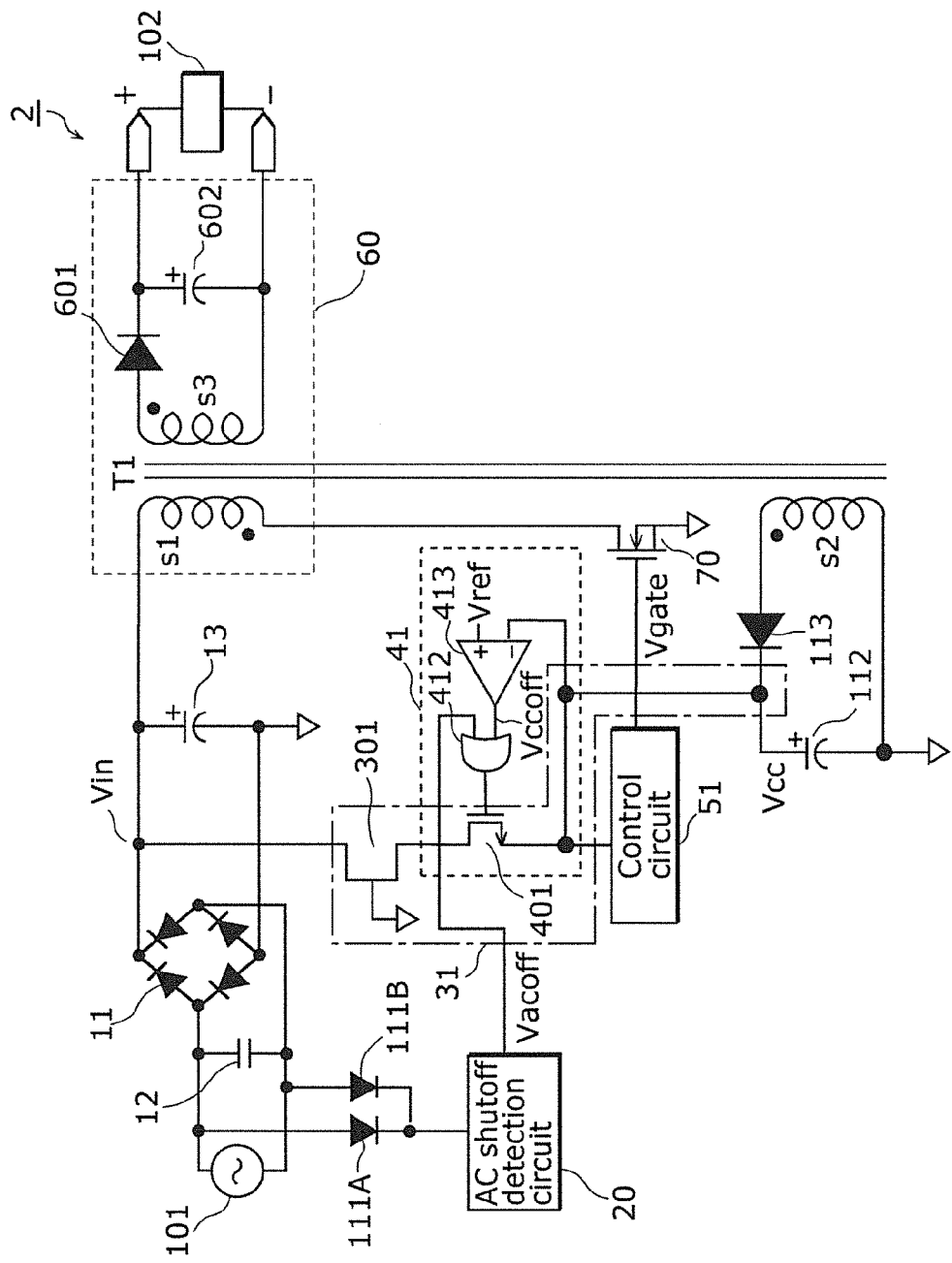
[FIG. 5]

FIG. 5 is a specific circuit diagram of the converter according to Embodiment 2. A converter 2 shown in this figure is different from the converter 1A shown in FIG. 3 in the output destination of the AC shutoff detection signal Vacoff and the structure of the regulator. Only the differences are described below, omitting descriptions of the same structures as the converter 1A shown in FIG. 3.

A regulator 41 includes the switch element 401, a logic element 412, and a voltage comparator 413. Here, the switch element 401 has both functions of the first discharging switch of the discharging circuit 30 and the switch element of the regulator 41.

The JFET 301 has a source connected to one of the terminals of the switch element 401. The negative-input terminal of the voltage comparator 413, the power voltage Vcc, the other terminal of the switch element 401, and a control circuit 51 are connected to one another. The AC shutoff detection signal Vacoff generated when an AC shutoff is detected and the Vccoff signal generated when the voltage level of the power voltage Vcc falls below the referential voltage Vref are input to the logic element 412.

While the converter 2 operates in a normal mode with the AC power supply 101 connected thereto, the voltage comparator 413 generates the Vccoff signal and places the switch element 401 in a conductive state via the logic element 412 when the power voltage Vcc falls below the referential voltage Vref that is positive input of the voltage comparator 413. By doing so, the power voltage Vcc increases because voltage is supplied from the DC voltage line through the JFET 301. When the power voltage Vcc reaches the same level as the referential voltage Vref, the voltage comparator 413 stops generating the Vccoff signal. When the AC shutoff detection signal Vacoff is input to the logic element 412, the switch element 401 is placed in a conductive state, with the result that residual charges are discharged up to the voltage level of the power voltage Vcc. After that, the power voltage Vcc is consumed by the control circuit 51 and the internal circuit and thus decreases gradually toward 0 V.

In other words, the switch element 401 according to this embodiment stabilizes the power voltage Vcc during a normal operation with the AC power supply 101 connected thereto and allows residual charges to be discharged at the time of an AC shutoff.

According to this embodiment, electricity can be discharged at high speed without being affected by an operation of the control circuit 51. Here, the power voltage Vcc is set to approximately 30 V, for example, and is normally at a level lower than or equal to 45 V that is an electric shock safety potential. Thus, as described above, the high-speed discharging to the power voltage Vcc will achieve the goal of electric shock prevention.

Furthermore, since the switch element incorporated in the regulator 41 can be used as both the charging path and the discharging path, it is no longer necessary to provide another discharging switch element as the discharging circuit, which leads to a size reduction and a reduced number of components.

Moreover, even upon an AC shutoff, the power voltage Vcc is held at a certain voltage level for the period until the end of the above discharging of residual charges, meaning that even upon an instantaneous power shutoff such as an AC shutoff occasion, the power voltage Vcc becomes available immediately, leading to quick recovery of the power circuit operation.

(Embodiment 3)

A converter according to Embodiment 3 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 3 further includes: a switch element which turns on and off terminal voltage of the smoothing capacitor; an input-output conversion unit which converts, to a desired DC voltage, the terminal voltage turned on or off by the switch element, and supplies the DC voltage to a load; a control circuit which controls the turning on and off of the switch element; and a regulator which supplies power voltage to the control circuit, wherein the source terminal of the junction transistor is connected to the regulator.

The control circuit according to Embodiment 3 places the above switch element in a non-conductive state when the AC shutoff detection signal is input, and the above first discharging switch is placed in a conductive state when the power voltage falls down to or below the reference voltage due to the non-conductive state of the switch element.

Figure 6:
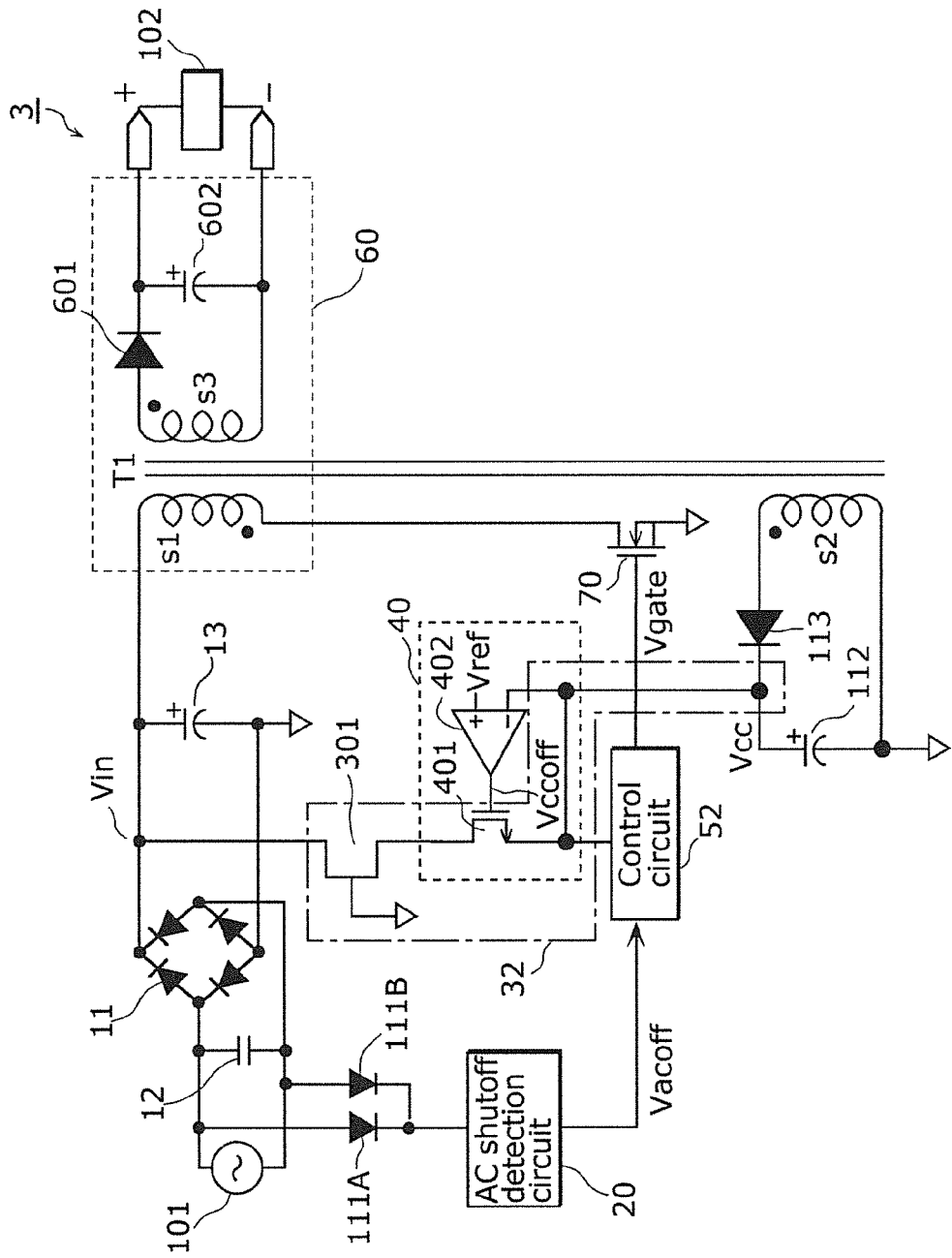
[FIG. 6]

FIG. 6 is a specific circuit diagram of the converter according to Embodiment 3. A converter 3 shown in this figure is different from the converter 1A shown in FIG. 3 in the output destination of the AC shutoff detection signal Vacoff, and the structure of the discharging circuit. Only the differences are described below, omitting descriptions of the same structures as the converter 1A shown in FIG. 3.

The regulator 40 includes the switch element 401 and the voltage comparator 402. Here, the switch element 401 has both functions of the first discharging switch of the discharging circuit 30 and the switch element of the regulator 40.

The JFET 301 has a source connected to one of the terminals of the switch element 401. The negative-input terminal of the voltage comparator 402, the power voltage Vcc, the other terminal of the switch element 401, and a control circuit 52 are connected to one another. The Vccoff signal generated when the voltage level of the power voltage Vcc falls below the referential voltage Vref is input to the gate of the switch element 401. The AC shutoff detection signal Vacoff generated when an AC shutoff is detected is input to the control circuit 52.

While the converter 3 operates in a normal mode with the AC power supply 101 connected thereto, the voltage comparator 402 generates the Vccoff signal and places the switch element 401 in a conductive state when the power voltage Vcc falls below the referential voltage Vref that is positive input of the voltage comparator 402. By doing so, the power voltage Vcc increases because voltage is supplied from the DC voltage line through the JFET 301. When the power voltage Vcc reaches the same level as the referential voltage Vref, the voltage comparator 402 stops generating the Vccoff signal.

When the AC power is shut off, the AC shutoff detection signal Vacoff is input to the control circuit 52, and the output of the Vgate signal is no longer input to the gate of the switch element 70, which stops the switching operation of the switch element 70. This control is called a brownout function and is applied to prevent abnormal operation by stopping the switching operation of the switching element 70 for generating power voltage when the AC power drops. Specifically, the above switching operation stops, and when no energy can be transferred to the secondary side of the transformer T1, the output on the secondary side drops, in proportion to which the VCC voltage drops by power consumption in the control circuit 52. When the Vcc voltage falls below the referential voltage Vref of the voltage comparator 402, the voltage comparator 402 generates the Vccoff signal which is then input to the gate of the switch element 401. The switch element 401 is placed in a conductive state according to the Vccoff signal and discharges, to the smoothing capacitor 112, residual charges in the X capacitor 12 and the smoothing capacitor 13. After that, the power voltage Vcc is consumed by the control circuit 52 and the internal circuit and thus decreases gradually from Vref toward 0 V.

With the above configuration, it is possible to discharge residual charges in the X capacitor 12 and the smoothing capacitor 13 by stopping the Vgate signal from the control circuit 52, which allows electric shock prevention. In addition, when the Vgate signal is stopped, the power supply to the power voltage Vcc by the switching operation of the switch element 70 is also stopped, with the result that overvoltage can be prevented which may be caused when the above discharging of residual charges causes excessive electricity to be supplied to the power voltage Vcc.

Moreover, even upon an AC shutoff, the power voltage Vcc is held at a certain voltage level for the period until the end of the above discharging of residual charges, meaning that even upon an instantaneous power shutoff such as an AC shutoff occasion, the power voltage Vcc becomes available immediately, leading to quick recovery of the power circuit operation.

In other words, the switch element 401 according to this embodiment stabilizes the power voltage Vcc during a normal operation with the AC power supply 101 connected thereto and allows residual charges to be discharged at the time of an AC shutoff. Thus, the switch element incorporated in the regulator 40 can be used as both the charging path and the discharging path, which eliminates the need to provide another discharging switch element as the discharging circuit and leads to a size reduction and a reduced number of components.

(Embodiment 4)

A converter according to Embodiment 4 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 4 further includes: a switch element which turns on and off terminal voltage of the smoothing capacitor; an input-output conversion unit which converts, to a desired DC voltage, the terminal voltage turned on or off by the switch element, and supplies the DC voltage to a load; a control circuit which controls the turning on and off of the switch element; and a regulator which supplies power voltage to the control circuit, wherein the source terminal of the junction transistor is connected to the regulator.

The discharging circuit according to Embodiment 4 further includes a second discharging switch between (i) a grounded terminal and (ii) the connection point between the above first discharging switch and the control circuit, and the second discharging switch lowers the power voltage of the control circuit when placed in a conductive state by application of the AC shutoff detection signal to its gate, and the above first discharging switch allows residual charges to be discharged when placed in a conductive state by the lowering of the power voltage of the control circuit.

Figure 7:
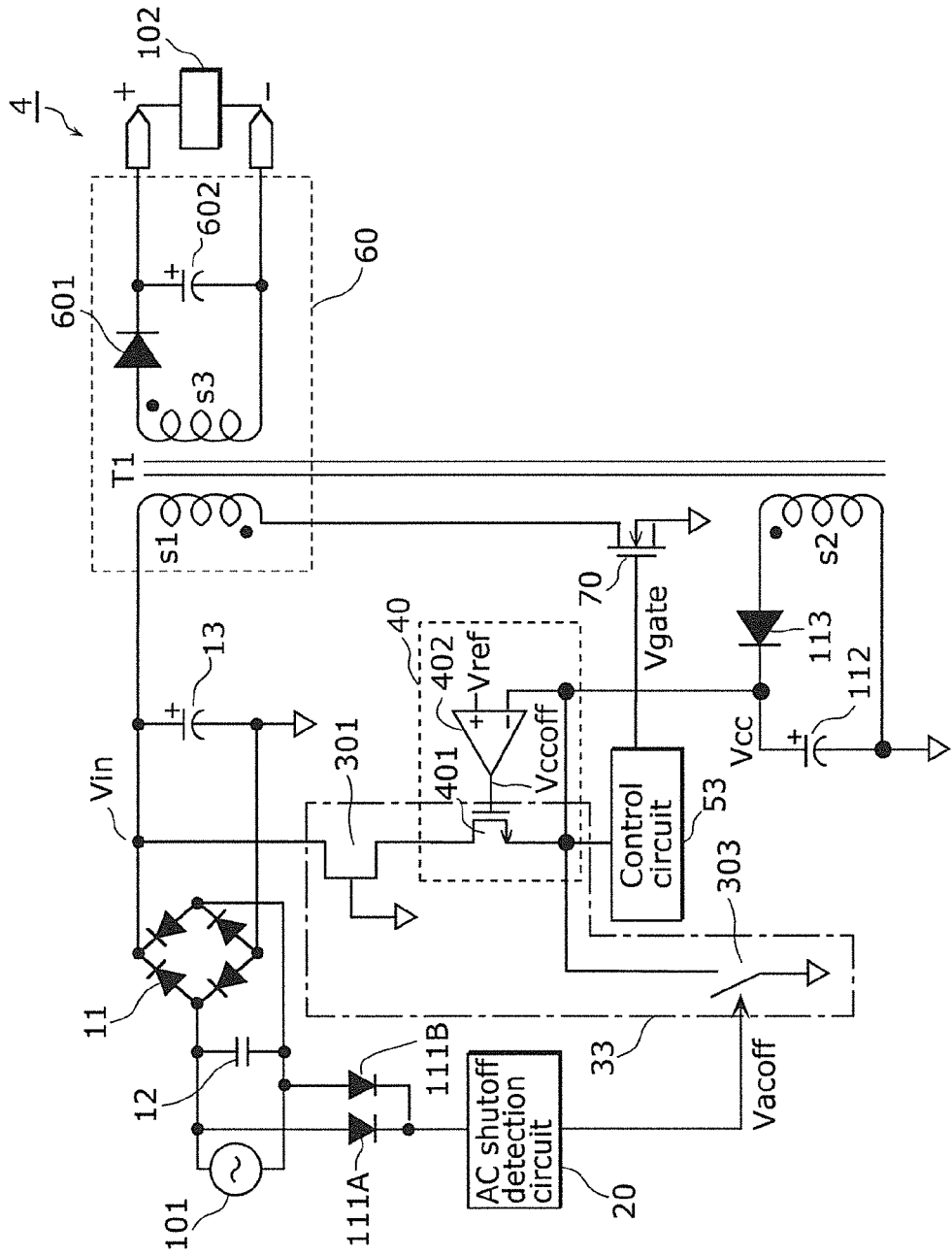
[FIG. 7]

FIG. 7 is a specific circuit diagram of the converter according to Embodiment 4. A converter 4 shown in this figure is different from the converter 1A shown in FIG. 3 in the output destination of the AC shutoff detection signal Vacoff, the discharging circuit, and the structure of the regulator. Only the differences are described below, omitting descriptions of the same structures as the converter 1A shown in FIG. 3.

The regulator 40 includes the switch element 401 and the voltage comparator 402. Here, the switch element 401 has both functions of the first discharging switch of the discharging circuit 30 and the switch element of the regulator 40.

A discharging circuit 33 includes the JFET 301, the switch element 401, and a discharging switch element 303. The JFET 301 has a source connected to one of the terminals of the switch element 401 and a gate connected to ground. With this connection configuration, the JFET 301 is capable of allowing current to constantly flow between the source and the drain thereof and has a function of lowering discharge voltage that is voltage of the residual charges being discharged. Furthermore, the JFET 301 is small in size and suitable for space-saving and a reduction in thickness. The discharging switch element 303 is a second discharging switch which has one terminal connected to ground and has a function of lowering the power voltage Vcc when placed in a conductive state by application of the AC shutoff detection signal to its gate. The switch element 401 is a first discharging switch which has a function of allowing residual charges to be discharged when placed in a conductive state by lowering of the power voltage Vcc.

The negative-input terminal of the voltage comparator 402, the power voltage Vcc, the other terminal of the switch element 401, the other terminal of the discharging switch element 303, and a control circuit 53 are connected to one another. The Vccoff signal generated when the voltage level of the power voltage Vcc falls below the referential voltage Vref is input to the gate of the switch element 401. The AC shutoff detection signal Vacoff generated when an AC shutoff is detected is input to the discharging switch element 303.

While the converter 4 operates in a normal mode with the AC power supply 101 connected thereto, the voltage comparator 402 generates the Vccoff signal and places the switch element 401 in a conductive state when the power voltage Vcc falls below the referential voltage Vref that is positive input of the voltage comparator 402. By doing so, the power voltage Vcc increases because voltage is supplied from the DC voltage line through the JFET 301. When the power voltage Vcc reaches the same level as the referential voltage Vref, the voltage comparator 402 stops generating the Vccoff signal.

When the AC power is shut off, and the AC shutoff detection signal Vacoff is input to the discharging switch element 303, the discharging switch element 303 is turned on. After the discharging switch element 303 is turned on, the power voltage Vcc is discharged first. When the power voltage Vcc is discharged toward a ground potential and falls below the referential voltage Vref, the regulator 40 executes a charging operation of power voltage which is to be supplied to the control circuit 53. At this point in time, all of the JFET 301, the switch element 401, and the discharging switch element 303 are turned on, and electricity starts to be discharged from the X capacitor 12 and the smoothing capacitor 13 to the ground. After that, the power voltage Vcc is discharged to the ground with the discharging switch element 303 in a conductive state and rapidly decreases from Vref toward 0 V.

With the above configuration, an AC power shutoff is followed first by lowering of the power voltage Vcc to around the pre-start-up voltage and then starting the discharging operation for the X capacitor 12 and the smoothing capacitor 13, with the result that overvoltage can be prevented which may be caused when the above discharging operation causes excessive electricity to be supplied to the power voltage Vcc.

Moreover, even upon an AC shutoff, the power voltage Vcc is held at a certain voltage level for the period until the end of the above discharging of residual charges, meaning that even upon an instantaneous power shutoff such as an AC shutoff occasion, the power voltage Vcc becomes available immediately, leading to quick recovery of the power circuit operation.

While the discharge of the power voltage Vcc in the converter 3 according to Embodiment 3 is effected by power consumption in the control circuit, the discharge of the power voltage Vcc in the converter 4 is direct discharge to the ground potential and therefore is faster than in the converter 3.

Here, the discharging operations are compared between the converter 1A according to Embodiment 1 shown in FIG. 3, the converter 2 according to Embodiment 2, the converter 3 according to Embodiment 3, and the converter 4 according to Embodiment 4.

Figure 8:
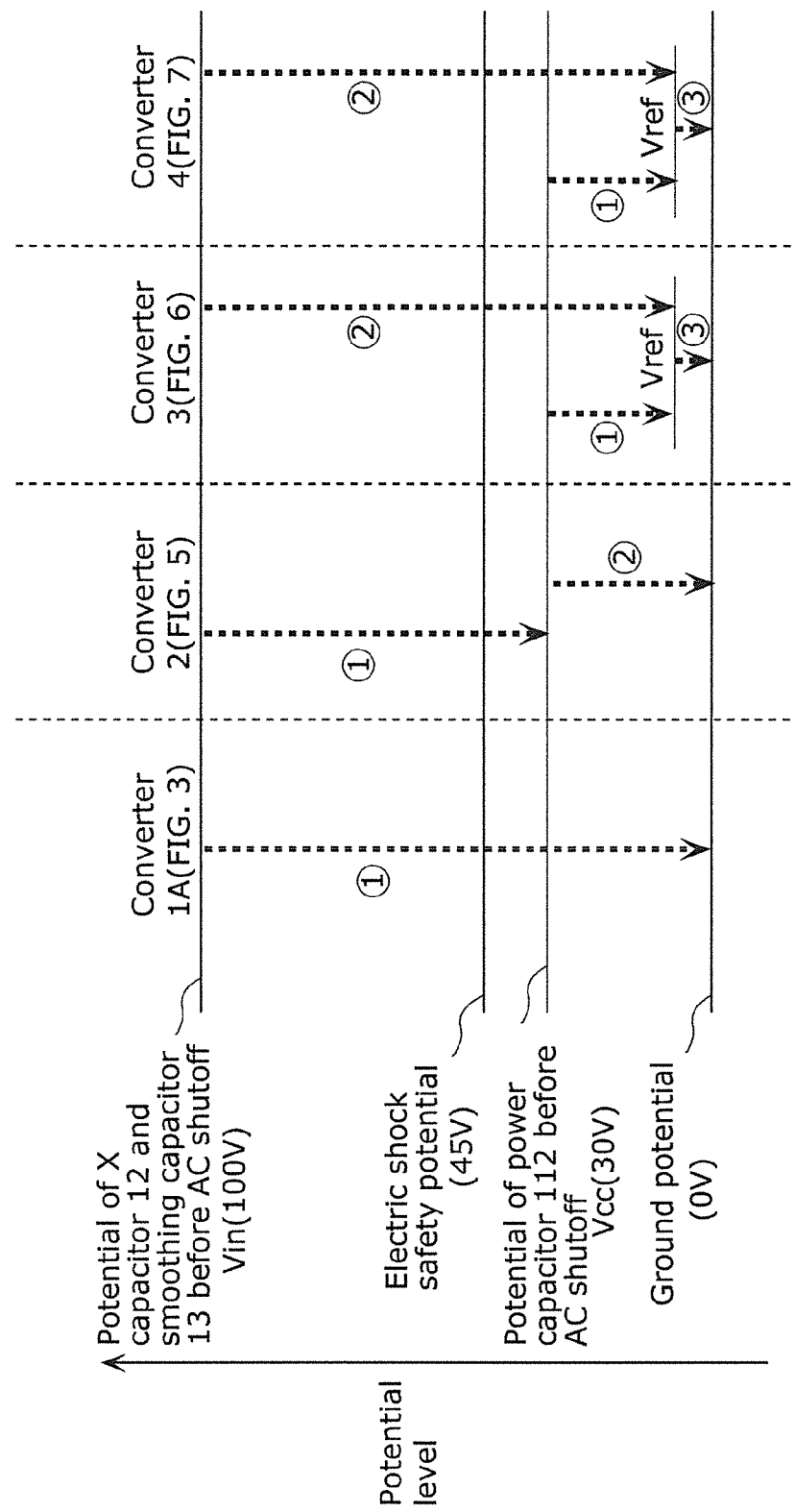
[FIG. 8]

FIG. 8 is a chart for explaining comparison between the discharging operations of the converters according to Embodiments 1 to 4.

In the case of the converter 1A, the discharging path and the power-supplying path are separated, with the result that a pre-AC-shutoff potential Vin of the X capacitor 12 and the smoothing capacitor 13 rapidly drops to the ground potential (0 V) after detection of an AC shutoff. In short, the discharge sequence in the converter 1A is a succession of (i) the output of the AC shutoff detection signal Vacoff and (ii) the discharging from the X capacitor 12 and the smoothing capacitor 13 to the ground.

In the case of the converter 2, the discharging path to the power voltage Vcc becomes available first after detection of an AC shutoff, with the result that the pre-AC-shutoff potential Vin rapidly drops to the power voltage Vcc and then drops further along with the positive-electrode potential of the smoothing capacitor 112. In short, the discharge sequence in the converter 2 is a succession of (i) the output of the AC shutoff detection signal Vacoff, (ii) the discharging from the X capacitor 12 and the smoothing capacitor 13 to Vcc, and (iii) the discharging of the power voltage Vcc to the ground.

In the case of the converter 3, the power voltage Vcc is lowered first after detection of an AC shutoff, with the result that the positive-electrode potential of the smoothing capacitor 112 drops to the referential potential Vref before the pre-AC-shutoff potential Vin drops. After that, the pre-AC-shutoff potential Vin and the positive-electrode potential of the smoothing capacitor 112 drop toward the referential potential Vref. Subsequently, the positive-electrode potential of the smoothing capacitor 112 drops to the ground potential (0 V) by power consumption in the control circuit 52. In short, the discharge sequence in the converter 3 is a succession of (i) the output of the AC shutoff detection signal Vacoff, (ii) the halt of the Vgate signal, (iii) the discharging of the power voltage Vcc to the referential potential, (iv) the output of the Vccoff signal, and (v) the discharging of the X capacitor 12 and the smoothing capacitor 13 from the referential potential.

In the case of the converter 4, the power voltage Vcc is lowered first after detection of an AC shutoff, with the result that the positive-electrode potential of the smoothing capacitor 112 drops to the referential potential Vref before the pre-AC-shutoff potential Vin drops. After that, the pre-AC-shutoff potential Vin and the positive-electrode potential of the smoothing capacitor 112 drop toward the referential potential Vref. Subsequently, the positive-electrode potential of the smoothing capacitor 112 drops to the ground potential (0 V) by power consumption in the control circuit 53. In short, the discharge sequence in the converter 4 is a succession of (i) the output of the AC shutoff detection signal Vacoff, (ii) the discharging of the power voltage Vcc to the referential potential, (iii) the output of the Vccoff signal, and (iv) the discharging of the X capacitor 12 and the smoothing capacitor 13 from the referential potential.

Although the above-described differences in the discharge sequence cause the converters to produce different effects of high-speed discharge, overvoltage prevention, and circuit recovery operation, all the converters are capable of discharging the X capacitor 12 and the smoothing capacitor 13 at high speed at the time of detection of an AC shutoff.

In addition, since the pre-AC-shutoff potential Vin is lowered by the JFET 301 during the discharging operation, no high-voltage element is required, but a low-voltage element is enough as the discharging switch element connected to the source of the JFET 301.

Thus, the converters according to Embodiments 1 to 4 allow a reduction in size and cost while taking measures for electric shocks in the AC power shutoff state.

(Embodiment 5)

A converter according to Embodiment 5 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 5 includes, between the above connection point and the smoothing capacitor, a diode inserted in series where a forward direction is a direction from the above connection point toward the smoothing capacitor.

Figure 9:
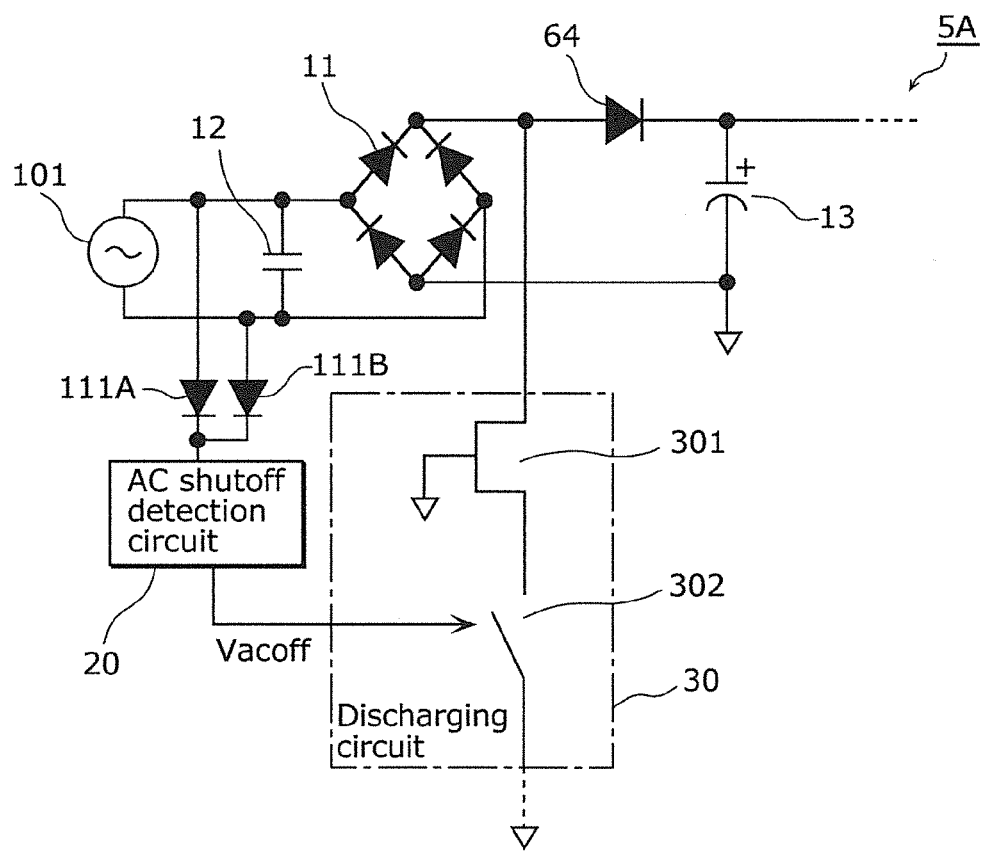
[FIG. 9]

FIG. 9 is a circuit diagram showing a configuration example of the converter according to Embodiment 5. A converter 5A shown in this figure is different in structure from the converter 1 shown in FIG. 1 only in that the diode is provided on the DC voltage line. Only the differences are described below, omitting descriptions of the same structures as the converter 1 shown in FIG. 1.

A diode 64 has an anode connected to the connection point between the bridge diode 11 and the discharging circuit 30 and a cathode connected to the positive electrode of the smoothing capacitor 13. With this connection, the diode 64 has a function of allowing residual charges in only the X capacitor 12 to be discharged, by preventing residual charges in the smoothing capacitor 13 from being discharged in the case where the discharging circuit 30 executes a discharging operation. In other words, the presence and absence of the diode 64 make it possible to select, as a target to be discharged, either the X capacitor 12 only or both the X capacitor 12 and the smoothing capacitor 13.

Figure 10:
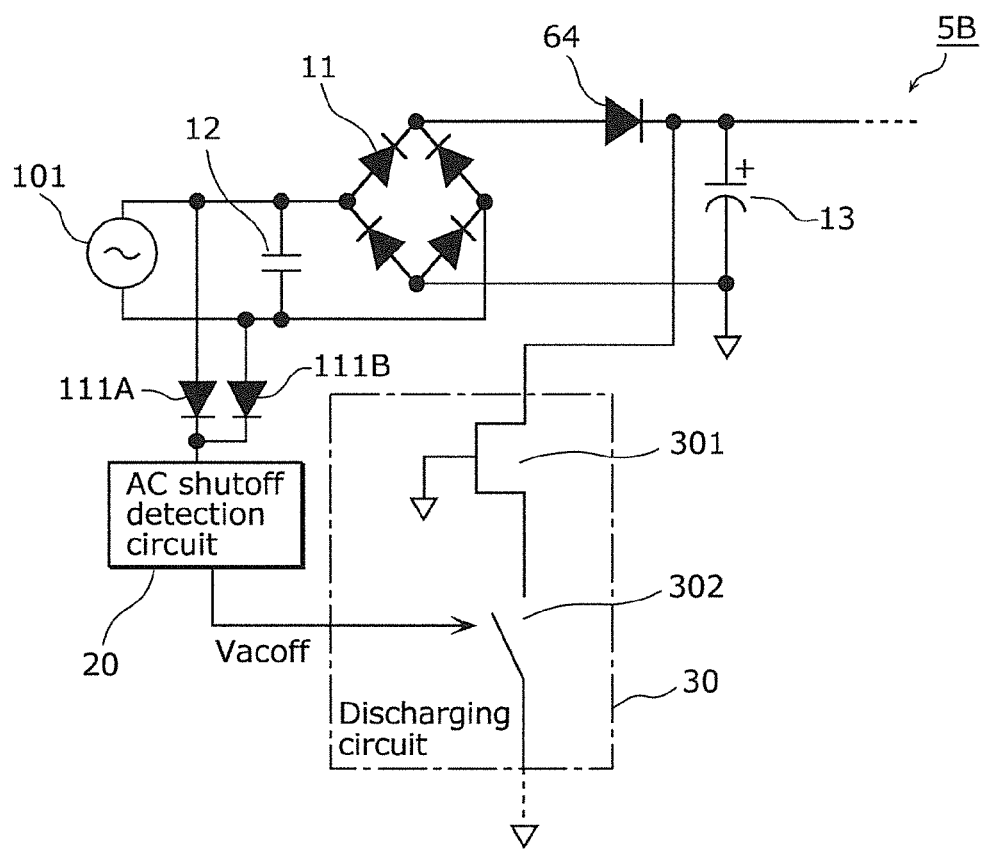
[FIG. 10]

FIG. 10 is a circuit diagram showing a configuration example of a converter according to Variation 1 of Embodiment 5. A converter 5B shown in this figure is different in structure from the converter 5A shown in FIG. 9 only in the position of the diode on the DC voltage line. Only the differences are described below, omitting descriptions of the same structures as the converter 5A shown in FIG. 9.

The diode 64 in this variation has an anode connected to the cathode of the bridge diode 11 and a cathode connected to the connection point between the discharging circuit 30 and the positive electrode of the smoothing capacitor 13. With this connection, the diode 64 is capable of allowing residual charges to be discharged from both the smoothing capacitor 13 and the X capacitor 12 in the case where the discharging circuit 30 executes a discharging operation.

Figure 11A:
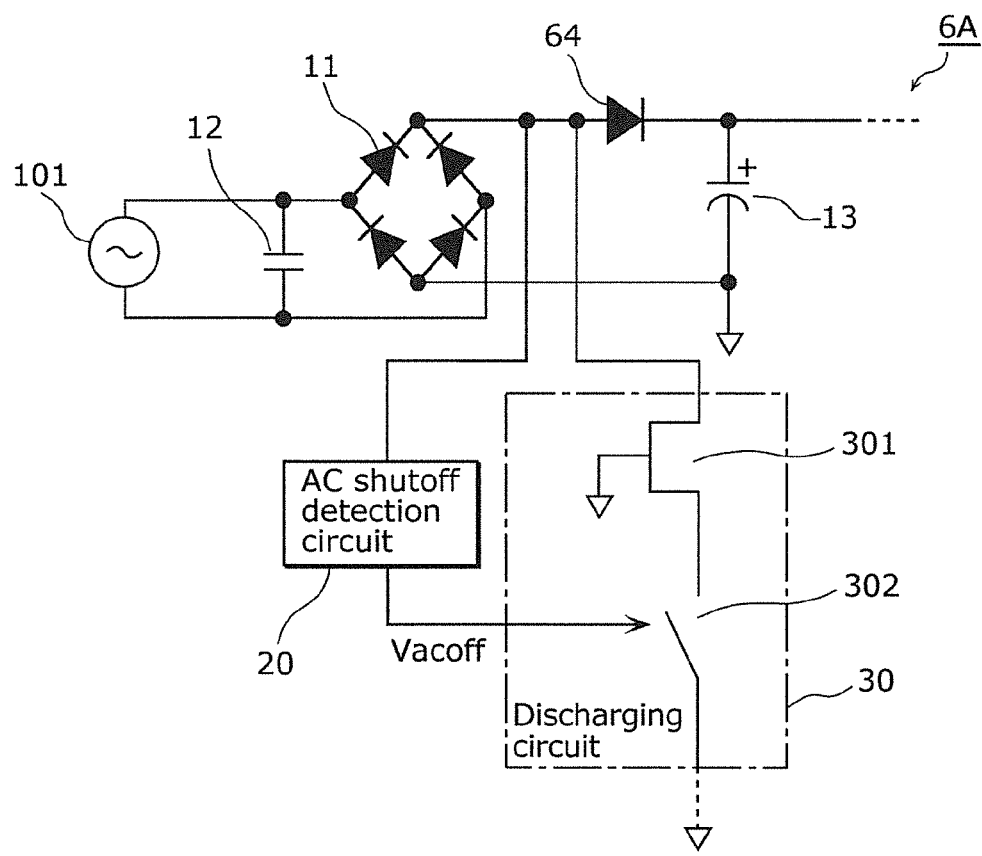
[FIG. 11A]

FIG. 11A is a circuit diagram showing a configuration example of a converter according to Variation 2 of Embodiment 5. A converter 6A shown in this figure is different in structure from the converter 5A shown in FIG. 9 in that the AC shutoff detection circuit 20 is connected to the DC voltage line. Only the differences are described below, omitting descriptions of the same structures as the converter 5A shown in FIG. 9.

The AC shutoff detection circuit 20 in this variation is connected to the connection point between the cathode of the bridge diode 11 and the anode of the diode 64. With this connection, the AC shutoff detection circuit 20 is connected to the DC voltage line, which eliminates the need for the rectifying diodes 111A and 111B which are indispensably provided in the converter 1 in which the AC shutoff detection circuit 20 is connected to the AC voltage line. Furthermore, the AC shutoff detection circuit 20 can be protected from external surge voltage which affects the AC shutoff detection circuit 20 when provided upstream of the bridge diode 11.

Furthermore, the discharging circuit 30 is also connected to the connection point between the cathode of the bridge diode 11 and the anode of the diode 64. With this connection, the diode 64 has a function of allowing residual charges in only the X capacitor 12 to be discharged, by preventing residual charges in the smoothing capacitor 13 from being discharged in the case where the discharging circuit 30 executes a discharging operation.

The following describes a configuration of the AC shutoff detection circuit connected to the connection point between the cathode of the bridge diode 11 and the anode of the diode 64.

Figure 11B:
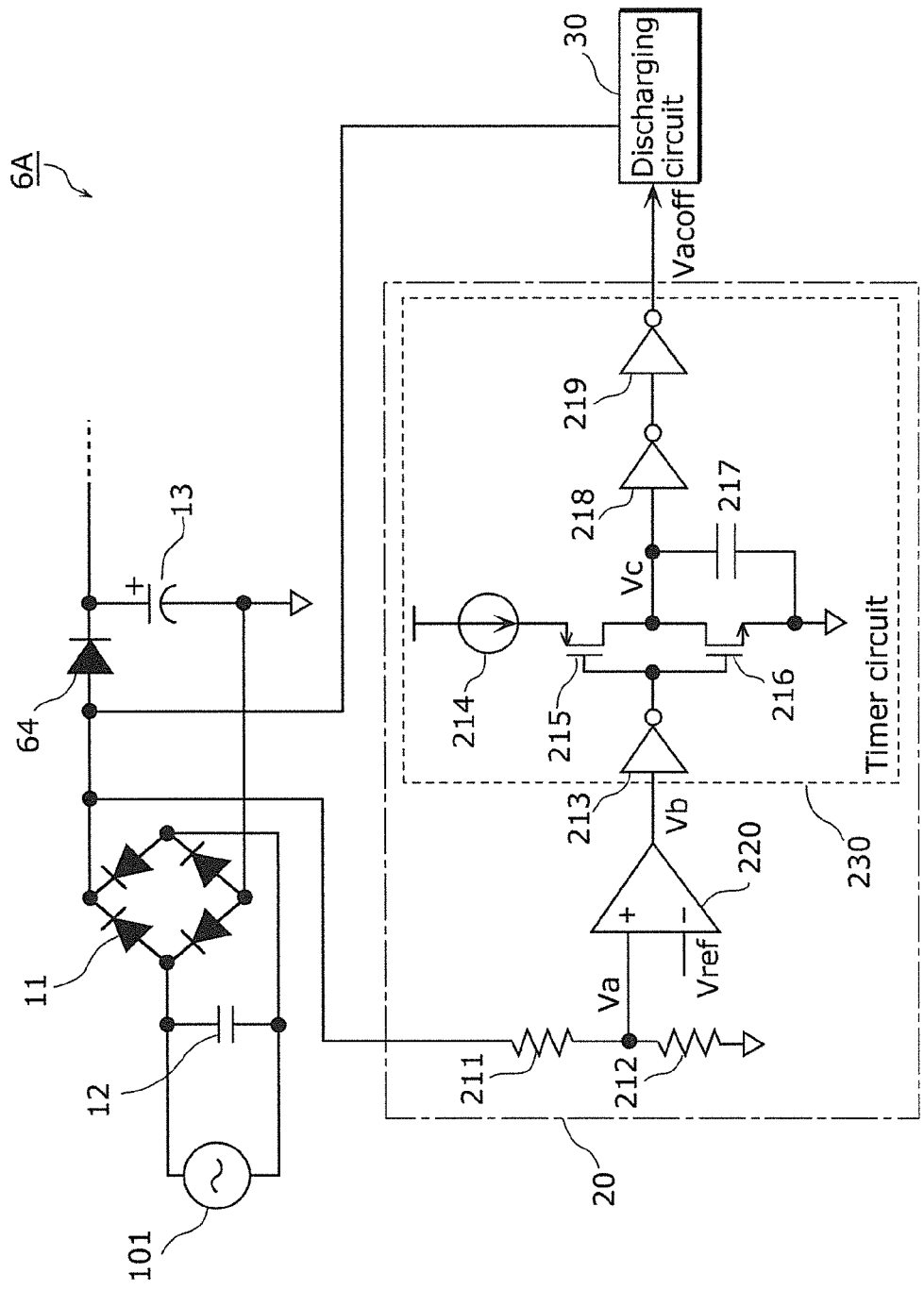
[FIG. 11B]

FIG. 11B is a specific circuit diagram of the converter according to Variation 2 of Embodiment 5. In the converter 6A shown in this figure, a configuration of the AC shutoff detection circuit 20 in the converter 6A shown in FIG. 11A is specifically shown. The circuit configuration and the circuit operation of the AC shutoff detection circuit 20 are described below.

The AC shutoff detection circuit 20 includes resistors 211 and 212, a voltage comparator 220, inverter circuits 213, 218, and 219, a P-type MOSFET 215, an N-type MOSFET 216, a constant-current supply 214, and a capacitor 217.

The voltage rectified by the bridge diode 11 is divided by the resistor 211 and the resistor 212. Voltage obtained by the voltage division is input to the positive electrode of the voltage comparator 220. The voltage comparator 220 compares the referential voltage Vref and the above input voltage obtained by the voltage division and when the input voltage exceeds the referential voltage Vref, generates an H-level signal and when the input voltage falls below the referential voltage Vref, generates an L-level signal. This H-level signal passes through the inverter circuit 213 and is converted to an L-level signal, and when this L-level signal is input to each gate, the P-type MOSFET 215 is turned on, and the N-type MOSFET 216 is turned off.

With the P-type MOSFET 215 on, charges from the constant-current supply 214 pass through the P-type MOSFET 215 and accumulate in the capacitor 217, causing an increase in voltage at a point Vc. When the voltage at Vc exceeds a threshold Vth of the inverter circuit 218 after a certain period of time T, the output of the inverter circuit 218 switches from H level to L level, and the signal switches to an H-level signal through the inverter circuit 219, and is output as the AC shutoff detection signal Vacoff. Here, it is sufficient that the certain period of time T is at least half the cycle length of AC power.

When the voltage comparator 220 generates an L-level signal, the signal passes through the inverter circuit 213 and switches to an H-level signal, and when this H-level signal is input to each gate, the P-type MOSFET 215 is turned off, and the N-type MOSFET 216 is turned on.

With the P-type MOSFET 215 off, the supply of current from the constant-current supply 214 to the capacitor 217 stops, and since the N-type MOSFET 216 is on, charges accumulated in the capacitor 217 are discharged, so that the voltage at the point Vc is reset to the L level. Then, the output of the inverter circuit 218 switches from L level to H level, and this H-level signal passes through the inverter circuit 219 and switches to an L-level signal, meaning that the AC shutoff detection signal Vacoff is no longer output.

Figure 11C:
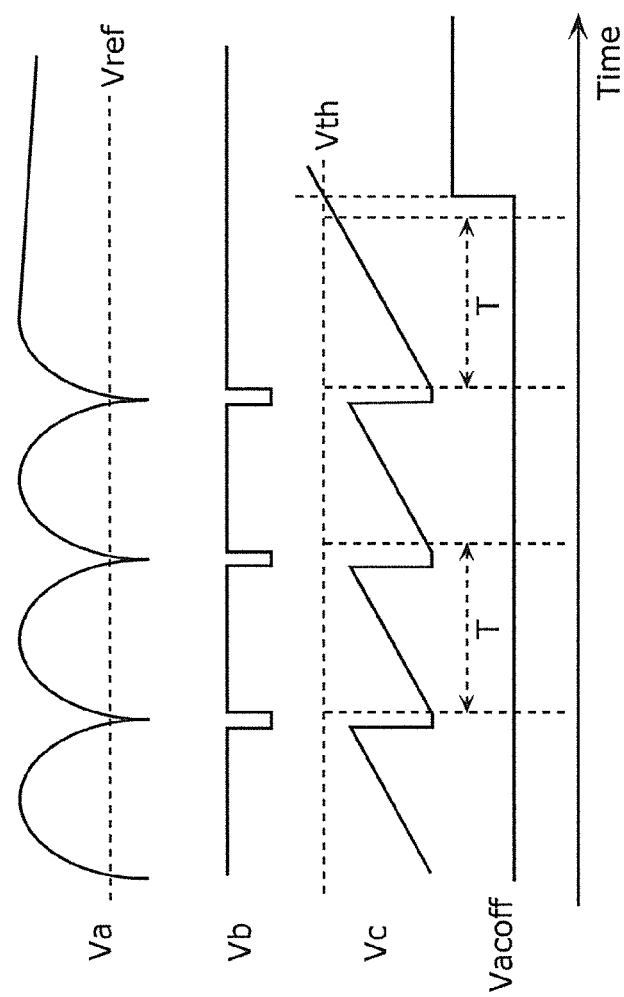
[FIG. 11C]

FIG. 11C is a timing chart showing operations of the AC shutoff detection circuit. Here, Va represents the input voltage at the positive electrode of the voltage comparator 220, Vb represents the output voltage of the voltage comparator 220, and Vc represents the voltage at the connection point between the capacitor 217 and the inverter circuit 218.

In a normal operation, the voltage Va crosses the referential voltage Vref in a certain cycle, and Vc is therefore reset at points in time when the voltage Va crosses the referential voltage Vref from the high-level side to the low-level side, and the AC shutoff detection signal Vacoff is not output. However, when the AC is shut off, Vc is no longer reset and after a certain period of time T has elapsed, the Vc reaches Vth, and the AC shutoff detection signal Vacoff is output.

It is to be noted that even when the AC shutoff detection circuit 20 is connected to the AC voltage line just as in the converter 1 shown in FIG. 1, the circuit configuration and the circuit operation of the AC shutoff detection circuit 20 are the same or like as the above-described circuit configuration and circuit operation.

Converters which are connected to a commercial AC power supply are generally designed to be protected from lightning surges. One of the representative lightning surge protectors is a varistor. A varistor is connected between the AC voltage lines (not shown). Through this varistor, a lightning surge goes to the ground. At this time, large current flows to the varistor through the AC voltage line, which means that there is a risk that part of this large current may flow into the AC shutoff detection circuit and thereby break it if the AC shutoff detection circuit is connected to the AC voltage line. In this regard, when the AC shutoff detection circuit 20 is connected to the line where current rectified by the bridge diode 11 flows, the influence of lightning surges is absorbed by the varistor located upstream of the bridge diode 11 so that the AC shutoff detection circuit 20 can be protected from lightning surges.

Figure 12:
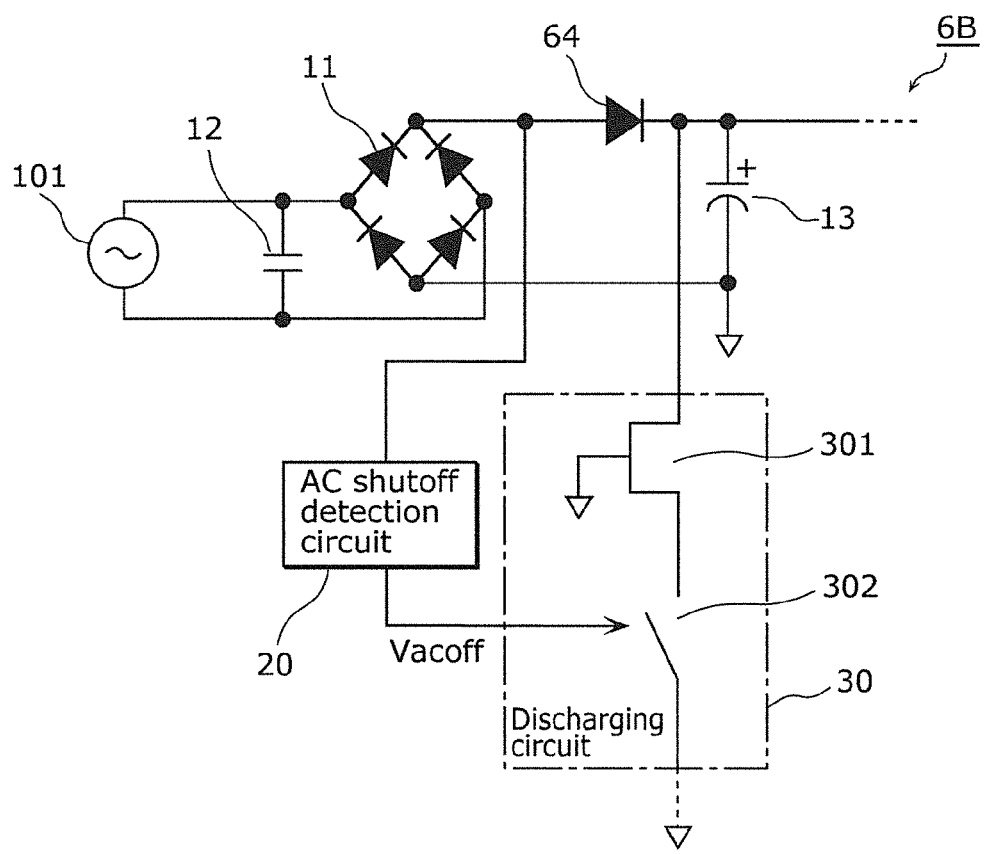
[FIG. 12]

FIG. 12 is a circuit diagram showing a configuration example of a converter according to Variation 3 of Embodiment 5. A converter 6B shown in this figure is different in structure from the converter 6A shown in FIG. 11A only in the position of the diode on the DC voltage line. Only the differences are described below, omitting descriptions of the same structures as the converter 6A shown in FIG. 11A.

The diode 64 in this variation has an anode connected to the cathode of the bridge diode 11 and a cathode connected to the connection point between the discharging circuit 30 and the positive electrode of the smoothing capacitor 13. With this connection, the diode 64 is capable of allowing residual charges to be discharged from both the smoothing capacitor 13 and the X capacitor 12 in the case where the discharging circuit 30 executes a discharging operation.

It is to be noted that basic circuit configurations of the converters 5A, 5B, 6A, and 6B have been illustrated in the embodiments, and this embodiment where the diode 64 is inserted to the DC voltage line is applicable to all the converters described in Embodiments 1 to 4 and produces the same or like effect that the target to be discharged can be limited, which is therefore included in the scope of this inventive concept.

In the converter 6B according to this variation, residual discharges in both the smoothing capacitor 13 and the X capacitor 12 can be discharged regardless of the presence or absence of the diode 64, but in the case where the AC shutoff detection circuit 20 is connected to the DC voltage line, the diode 64 is indispensable. This is because, in the case where the diode 64 is not provided, DC voltage smoothed by the smoothing capacitor 13 is applied to the DC voltage line, meaning that the detection of a ripple of the DC voltage to detect an AC power supply as described with reference to FIG. 11B is impossible.

(Embodiment 6)

A converter according to Embodiment 6 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 6 includes, between the above connection point and the smoothing capacitor: a diode inserted in series where a forward direction is a direction from the above connection point toward the smoothing capacitor; and a resistor connected in series with the diode.

Figure 13:
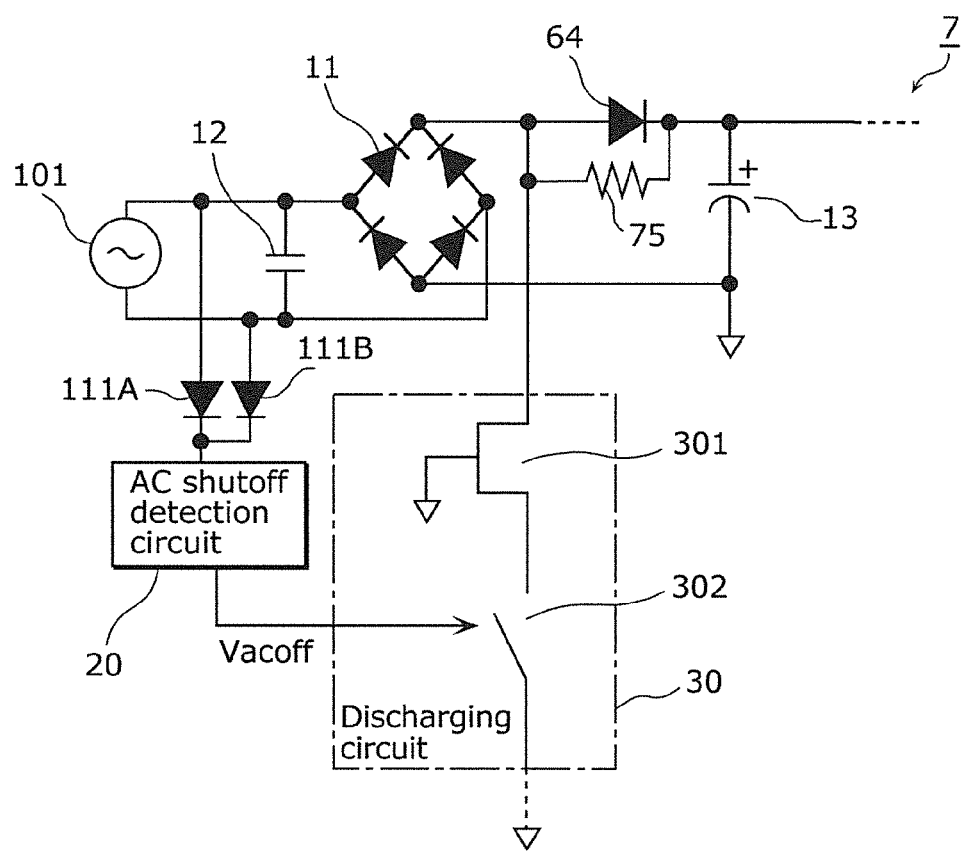
[FIG. 13]

FIG. 13 is a circuit diagram showing a configuration example of a converter according to Embodiment 6. A converter 7 shown in this figure is different in structure from the converter 5A shown in FIG. 9 only in that a resistor 75 connected in parallel with the diode 64 is provided. Only the differences are described below, omitting descriptions of the same structures as the converter 5A shown in FIG. 9.

The resistor 75 is located between the point to which the discharging circuit 30 is connected and the positive electrode of the smoothing capacitor on the DC voltage line, and is connected in parallel with the diode 64. The resistor 75 has a resistance of several tens of kilo-ohms (kΩ) to several mega-ohms (MΩ), for example.

While residual charges in only the X capacitor 12 are discharged in the converter 5A according to Embodiment 5, residual charges in the X capacitor 12 are preferentially discharged and residual charges in the smoothing capacitor 13 can also be discharged in the converter 7 according to this embodiment.

The following describes a reason why the above preferential discharge is necessary. As to residual voltage in a power plug after pulled out (which corresponds to residual voltage in the X capacitor 12 in the present application), there has been an established safety standard as described in PTL 1. In order to meet this safety standard, residual charges in the X capacitor 12 need to be discharged within a predetermined period of time; for example, the structure for allowing residual charges in only the X capacitor 12 to be discharged, just as that of the converter 5A according to Embodiment 5, is one of the best modes. However, in this case, residual charges in the smoothing capacitor 13 cannot be discharged, leaving a risk of an electric shock happening to a service engineer who touches this smoothing capacitor 13 when working on the converter for maintenance etc., for example. Hence, from the above perspective, allowing residual charges in only the X capacitor 12 to be discharged is not sufficient as an electric shock prevention measure.

Thus, connecting the resistor 75 as in the converter 7 according to this embodiment causes residual charges in the X capacitor 12 to be preferentially discharged and makes it possible to also discharge residual charges in the smoothing capacitor 13 after a predetermined length of time, allowing prevention of electric shocks which are caused due to residual charges in the smoothing capacitor 13. Since only adding one resistor 75 makes it possible to discharge residual charges in both the X capacitor 12 and the smoothing capacitor 13, both the cost increase and the increase in mounting area can be minimized.

Figure 14:
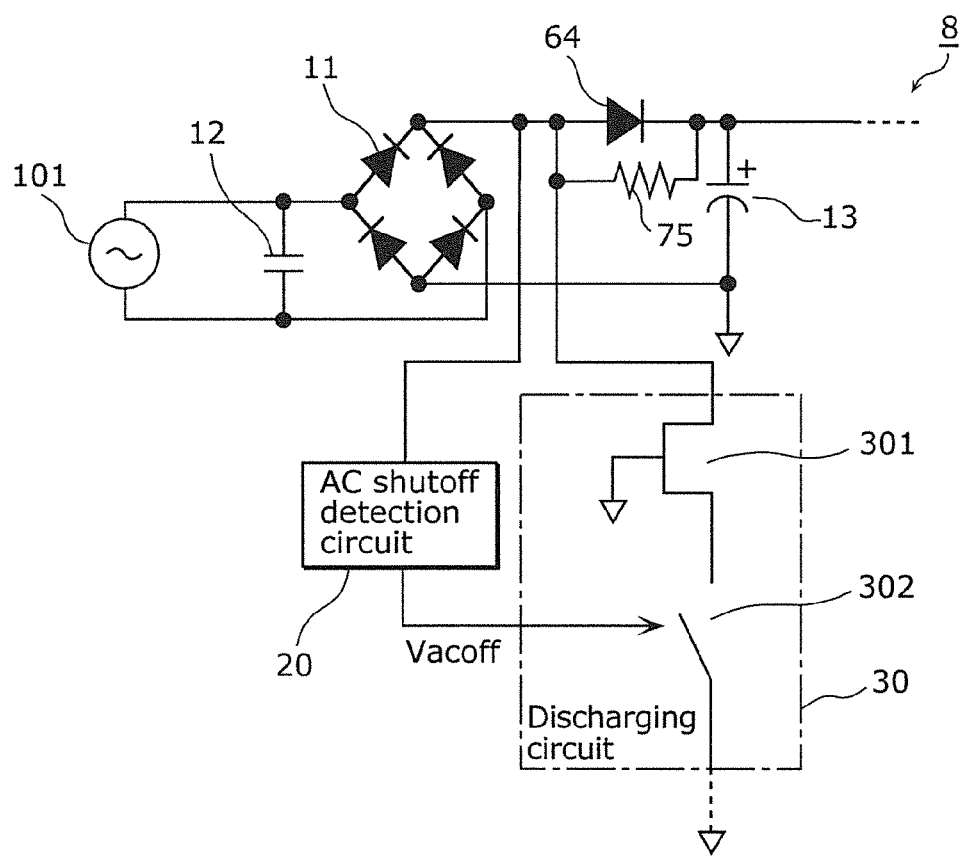
[FIG. 14]

FIG. 14 is a circuit diagram showing a configuration example of a converter according to Variation of Embodiment 6. A converter 8 shown in this figure is different in structure from the converter 7 shown in FIG. 13 in that the AC shutoff detection circuit 20 is connected to the DC voltage line. Only the differences are described below, omitting descriptions of the same structures as the converter 7 shown in FIG. 13.

The AC shutoff detection circuit 20 in this variation is connected to the connection point between the cathode of the bridge diode 11 and the anode of the diode 64. With this connection, the AC shutoff detection circuit 20 is connected to the DC voltage line, which eliminates the need for the rectifying diodes 111A and 111B which are indispensably provided in the converter 7 in which the AC shutoff detection circuit 20 is connected to the AC voltage line. Furthermore, the AC shutoff detection circuit 20 can be protected from external surge voltage which affects the AC shutoff detection circuit 20 when provided upstream of the bridge diode 11.

It is to be noted that basic circuit configurations of the converters 7 and 8 have been illustrated in the embodiments, and this embodiment where the diode 64 and the resistor 75 are inserted to the DC voltage line is applicable to all the converters described in Embodiments 1 to 5 and produces the same or like effect that the target to be discharged can be limited, which is therefore included in the scope of this inventive concept.

(Embodiment 7)

A converter according to Embodiment 7 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which "detects a shutoff of half-wave rectified AC voltage" and outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 7 further includes: a switch element which turns on and off terminal voltage of the smoothing capacitor; an input-output conversion unit which converts, to a desired DC voltage, the terminal voltage turned on or off by the switch element, and supplies the DC voltage to a load; a control circuit which controls the turning on and off of the switch element; and a regulator which supplies power voltage to the control circuit, wherein the source terminal of the junction transistor is connected to the regulator.

Specifically, in the converter according to Embodiment 7, the first discharging switch has one end connected to the source terminal of the junction transistor and the other end connected to ground, and the discharging circuit is grounded to allow residual charges to be discharged through the junction transistor and the first discharging switch in a path independent of the current path extending from the regulator to the control circuit.

Figure 15A:
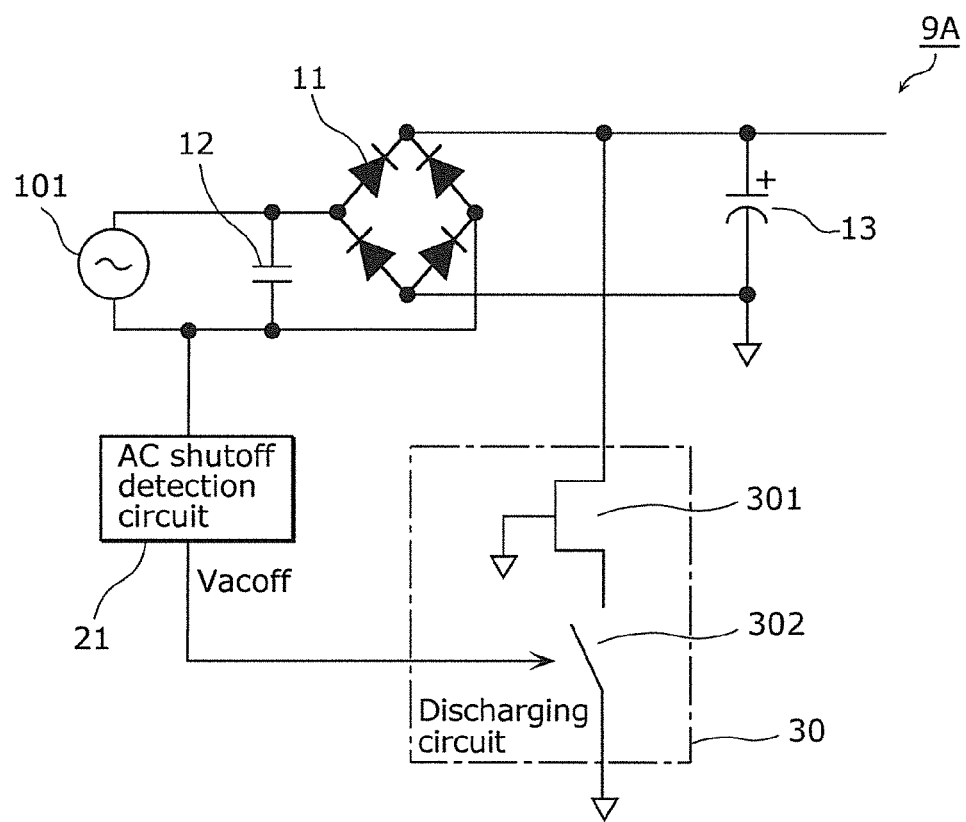
FIG. 15A is a specific circuit diagram of a converter according to Embodiment 7.

FIG. 15A is a specific circuit diagram of a converter according to Embodiment 7. A converter 9A shown in this figure is different from the converter 1 shown in FIG. 1 in that the AC shutoff detection circuit 20 which detects full-wave rectified AC voltage is replaced by an AC shutoff detection circuit 21 which detects half-wave rectified AC voltage and that the diode 111A and the diode 111B are no longer necessary. Only the differences are described below.

The AC shutoff detection circuit 21 is directly connected to the AC voltage line and is capable of detecting that the input AC voltage has been shutoff, by detecting a change in the DC voltage resulting from half-wave rectification by the bridge diode 11. Specifically, the AC shutoff detection circuit 21 detects that the AC power supply 101 and the converter 9A have become non-conductive, that is, that the input AC voltage has been shutoff, and at this time, the AC shutoff detection circuit 21 outputs an AC shutoff detection signal Vacoff.

Figure 15B:
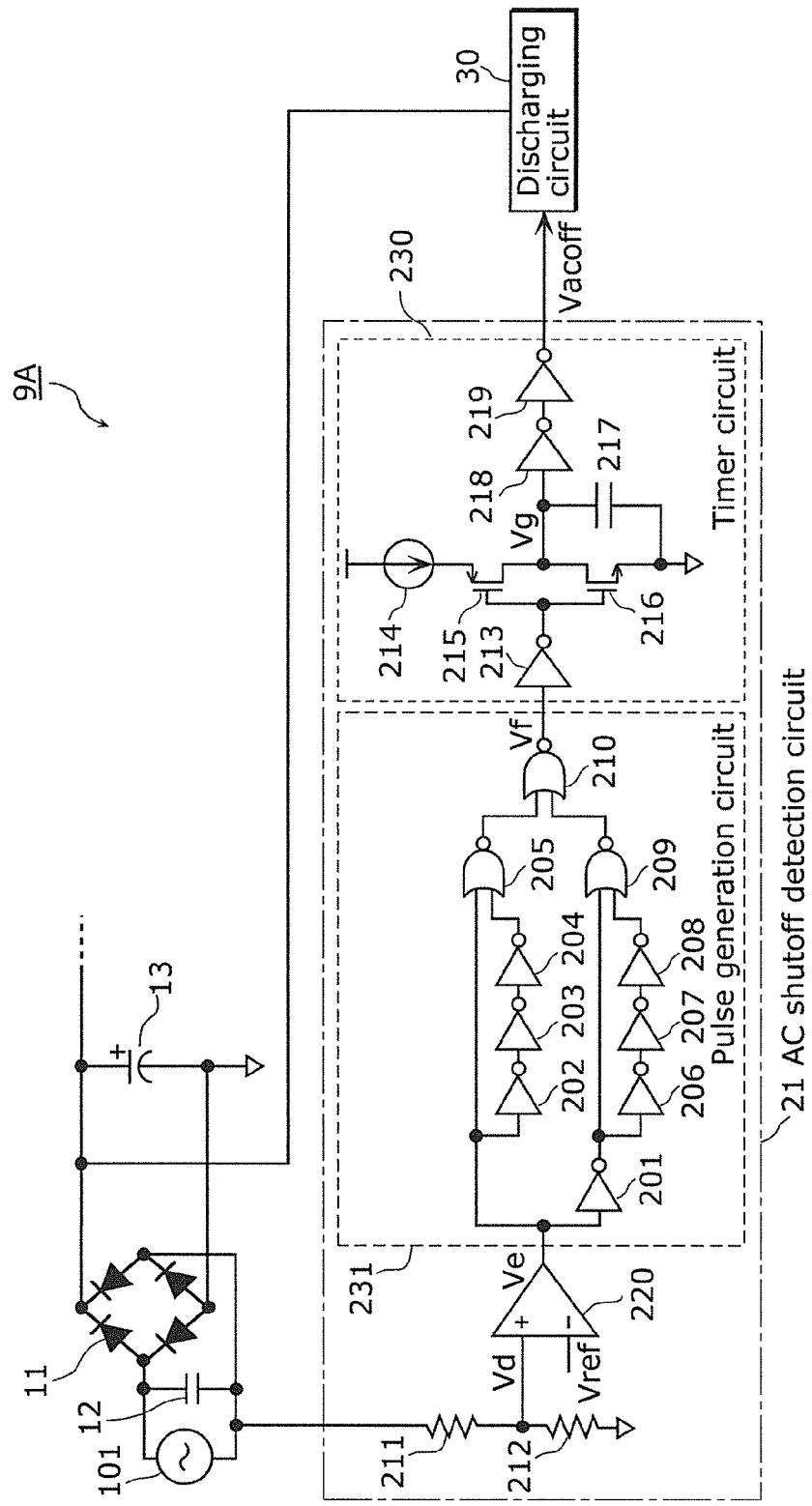
[FIG. 15B]

FIG. 15B is a specific circuit diagram of the converter according to Embodiment 7. In the converter 9A shown in this figure, the configuration of the AC shutoff detection circuit 21 in the converter 9A shown in FIG. 15A is specifically shown. The circuit configuration and the circuit operation of the AC shutoff detection circuit 21 are described below.

The AC shutoff detection circuit 21 is different in structure from the AC shutoff detection circuit 21 shown in FIG. 11B in that a pulse generation circuit 231 is connected between the output of the voltage comparator 220 and the input of a timer circuit 230 and that the resistor 211 has one end connected to not the cathode terminal of the bridge diode, but the other end of the X capacitor 12. Only the differences are described below, omitting descriptions of the same structures as the converter 6A shown in FIG. 11B.

The AC shutoff detection circuit 21 includes the resistors 211 and 212, the voltage comparator 220, the pulse generation circuit 231, and the timer circuit 230. The pulse generation circuit 231 includes inverter circuits 201, 202, 203, 204, 206, 207, and 208, and NOR circuits 205, 209, and 210. The timer circuit 230 includes the inverter circuits 213, 218, and 219, the P-type MOSFET 215, the N-type MOSFET 216, the constant-current supply 214, and the capacitor 217.

A signal generated by the voltage comparator 220 is input to the inverter circuits 201 and 202 and the NOR circuit 205. When the signal generated by the voltage comparator 220 switches from an H-level signal to an L-level signal, an L-level signal is input to each of the NOR circuit 205 and the inverter circuits 202 and 201. The L-level signal provided to the inverter circuit 202 is converted to an H-level signal through the inverter circuits 203 and 204. It takes time around several tens to several hundreds of nanoseconds (ns) until the L-level signal provided to the inverter circuit 202 is converted to the H-level signal and then is input to the NOR circuit 205. Therefore, in this signal conversion period, an L-level signal from the inverter circuit 204 and an L-level signal from the voltage comparator 220 are input to the NOR circuit 205, with the result that the NOR circuit 205 outputs an H-level signal. After the above signal conversion, an H-level signal from the inverter circuit 204 and a direct L-level signal from the voltage comparator 220 are input to the NOR circuit 205, with the result that the NOR circuit 205 outputs an L-level signal. In other words, when the signal generated by the voltage comparator 220 switches from an H-level signal to an L-level signal, the NOR circuit 205 outputs H-level pulsed signals of about several tens to several hundreds of nanoseconds (ns), and these pulsed signals are input to a NOR circuit 210.

Meanwhile, the L-level signal provided to the inverter circuit 201 from the voltage comparator 220 is converted to an H-level signal, and this H-level signal is directly input to a NOR circuit 209. Furthermore, before the signal generated by the voltage comparator 220 switches from an H-level signal to an L-level signal, the H-level signal from the inverter circuit 208 is input to the NOR circuit 209, which means that while the signal generated by the voltage comparator 220 switches from an H-level signal to an L-level signal, an H-level signal is input to at least one of the two inputs of the NOR circuit 209, with the result that the NOR circuit 209 generates an L-level signal and inputs the L-level signal to the NOR circuit 210.

As above, when the signal generated by the voltage comparator 220 switches from an H-level signal to an L-level signal, the H-level pulsed signal generated by the NOR circuit 205 and the L-level signal generated by the NOR circuit 209 are input to the NOR circuit 210, and the NOR circuit 210 outputs an L-level pulsed signal. This L-level pulsed signal passes through the inverter circuit 213 and is converted to an H-level pulsed signal, and when this H-level pulsed signal is input to each gate, the P-type MOSFET 215 is turned off, and the N-type MOSFET 216 is turned on.

With the P-type MOSFET 215 off, the supply of current from the constant-current supply 214 to the capacitor 217 stops, and since the N-type MOSFET 216 is on, charges accumulated in the capacitor 217 are discharged, so that the voltage at a point Vg is reset to the L level. As a result, the output of the inverter circuit 218 is maintained at H level, and the AC shutoff detection signal Vacoff is maintained as an L-level signal.

Furthermore, when the signal generated by the voltage comparator 220 switches from an L-level signal to an H-level signal, the L-level signal generated by the NOR circuit 205 and the H-level pulsed signal generated by the NOR circuit 209 are input to the NOR circuit 210, and the NOR circuit 210 outputs an L-level pulsed signal. Subsequent circuit operations are the same as those executed when the signal generated by the voltage comparator 220 switches from an H-level signal to an L-level signal.

When the NOR circuit 210 does not generate the L-level pulsed signal, but generates an H-level signal, the H-level signal passes through the inverter circuit 213 and switches to an L-level signal, the P-type MOSFET 215 is turned on, and the N-type MOSFET 216 is turned off.

With the P-type MOSFET 215 on, charges from the constant-current supply 214 through the P-type MOSFET 215 accumulate in the capacitor 217, causing an increase in voltage at the point Vg. When the voltage at Vg exceeds a threshold Vth of the inverter circuit 218 after a certain period of time T, the output of the inverter circuit 218 switches from H level to L level, and the signal switches to an H-level signal through the inverter circuit 219, and is output as the AC shutoff detection signal Vacoff. Here, it is sufficient that the certain period of time T is at least half the cycle length of AC power.

Figure 15C:
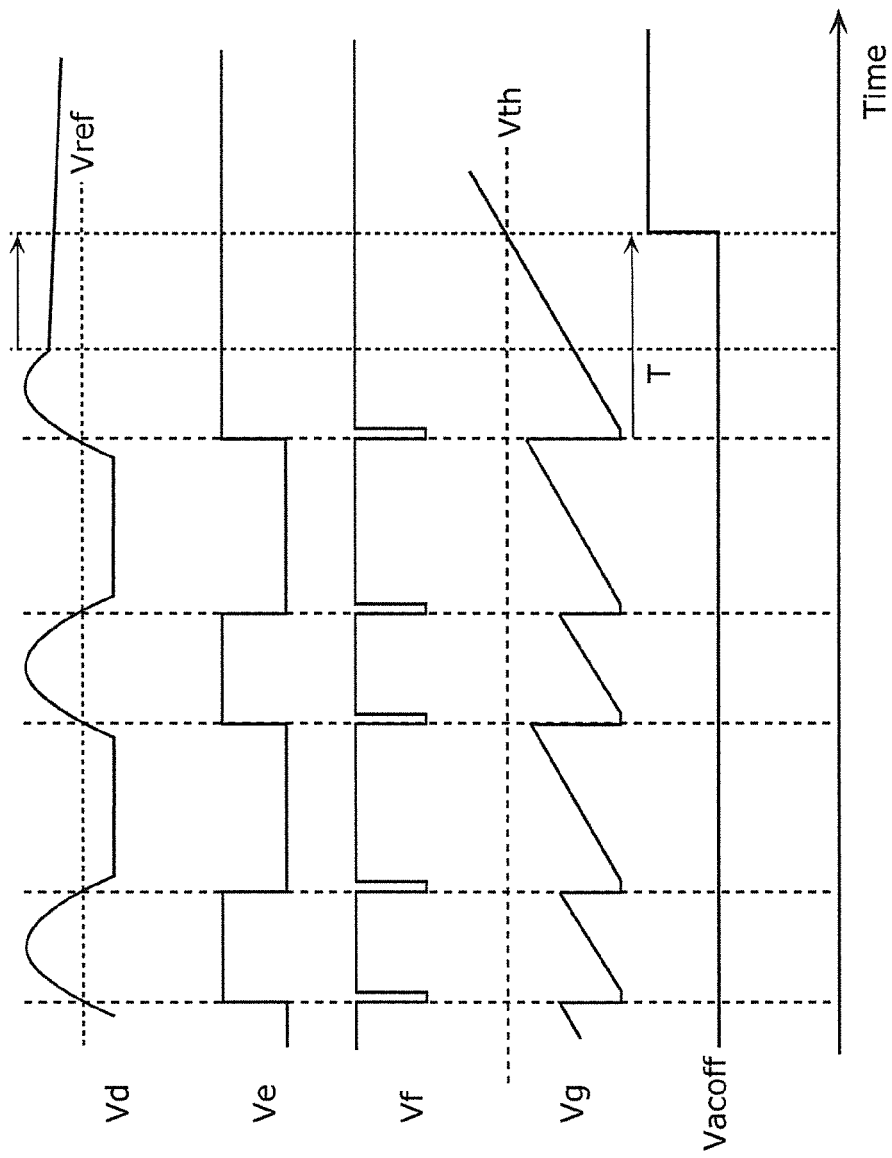
[FIG. 15C]

FIG. 15C is a timing chart showing operations of the AC shutoff detection circuit 21. Here, Vd represents the input voltage at the positive electrode of the voltage comparator 220, Ve represents the output voltage of the voltage comparator 220, and Vf represents the output voltage of the NOR circuit 210, and Vg represents the voltage at the connection point between the capacitor 217 and the inverter circuit 218.

In a normal operation, the voltage Vd crosses the referential voltage Vref in a certain cycle, and Vg is therefore reset at points in time when the voltage Vd crosses the referential voltage Vref from the high-level side to the low-level side and at points in time when the voltage Vd crosses the referential voltage Vref from the low-level side to the high-level side, and the AC shutoff detection signal Vacoff is not output. However, when the AC is shut off, Vg is no longer reset and after a certain period of time T has elapsed, the Vg reaches Vth, and the AC shutoff detection signal Vacoff is output.

The AC shutoff detection circuit 21 does not have the diodes 111A and 111B connected thereto which are provided in order to rectify the input AC voltage in the converter 1 shown in FIG. 1, and is capable of detecting that the input AC voltage has been shutoff even when the input AC voltage has been half-wave rectified, with the result that the components of the power circuit can be reduced. Furthermore, the resistors 211 and 212 consume approximately half the power consumed when a shutoff of the full-wave rectified input AC voltage is detected, improving the power efficiency.

It is to be noted that the AC shutoff detection circuit 21 in this embodiment only needs to be able to detect an AC shutoff even with residual charges in the X capacitor 12.

(Embodiment 8)

A converter according to Embodiment 8 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which "detects a shutoff of half-wave rectified AC voltage" and outputs an AC shutoff detection signal when the input AC voltage being applied to an input terminal is shut off; and a discharging circuit which is connected to a connection point between a cathode of the bridge diode and the smoothing capacitor, and allows residual charges in at least one of the smoothing capacitor and the across-the-line capacitor to be discharged when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Furthermore, the converter according to Embodiment 8 includes, between the above connection point and the smoothing capacitor, a diode inserted in series where a forward direction is a direction from the above connection point toward the smoothing capacitor.

Figure 16:
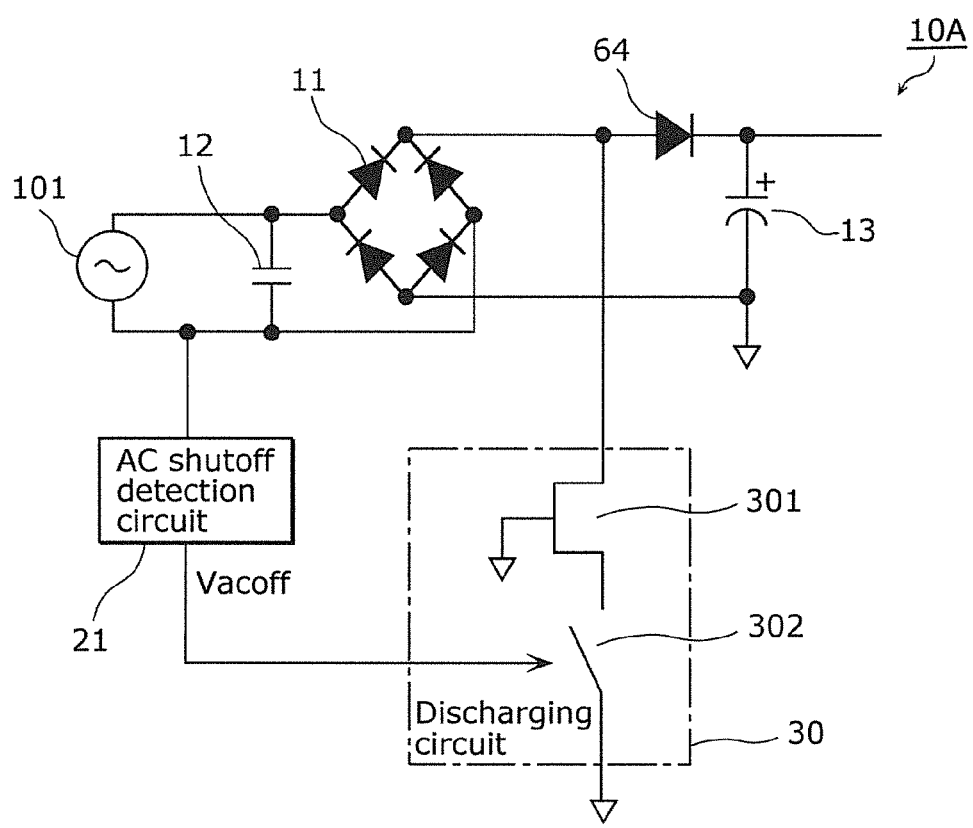
[FIG. 16]

FIG. 16 is a circuit diagram showing a configuration example of a converter according to Embodiment 8. A converter 10A shown in this figure is different from the converter 9A shown in FIG. 15A only in that the diode is provided on the DC voltage line. Only the differences are described below, omitting descriptions of the same structures as the converter 9A shown in FIG. 15A.

The diode 64 has an anode connected to the connection point between the bridge diode 11 and the discharging circuit 30 and a cathode connected to the positive electrode of the smoothing capacitor 13. With this connection, the diode 64 has a function of allowing residual charges in only the X capacitor 12 to be discharged, by preventing residual charges in the smoothing capacitor 13 from being discharged in the case where the discharging circuit 30 executes a discharging operation. In other words, the presence and absence of the diode 64 make it possible to select, as a target to be discharged, either the X capacitor 12 only or both the X capacitor 12 and the smoothing capacitor 13.

Figure 17:
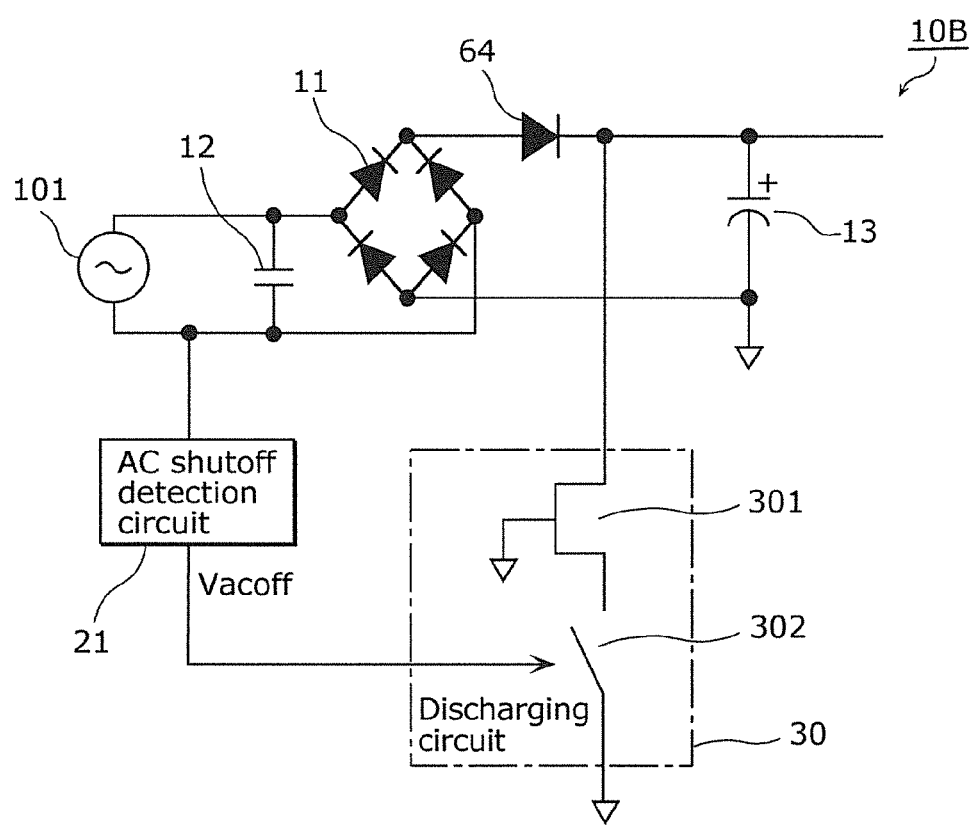
[FIG. 17]

FIG. 17 is a circuit diagram showing a configuration example of a converter according to Variation 1 of Embodiment 8. A converter 10B shown in this figure is different in structure from the converter 10A shown in FIG. 16 only in the position of the diode on the DC voltage line. Only the differences are described below, omitting descriptions of the same structures as the converter 10A shown in FIG. 16.

The diode 64 in this variation has an anode connected to the cathode of the bridge diode 11 and a cathode connected to the connection point between the discharging circuit 30 and the positive electrode of the smoothing capacitor 13. With this connection, the diode 64 is capable of allowing residual charges to be discharged from both the smoothing capacitor 13 and the X capacitor 12 in the case where the discharging circuit 30 executes a discharging operation.

Figure 18:
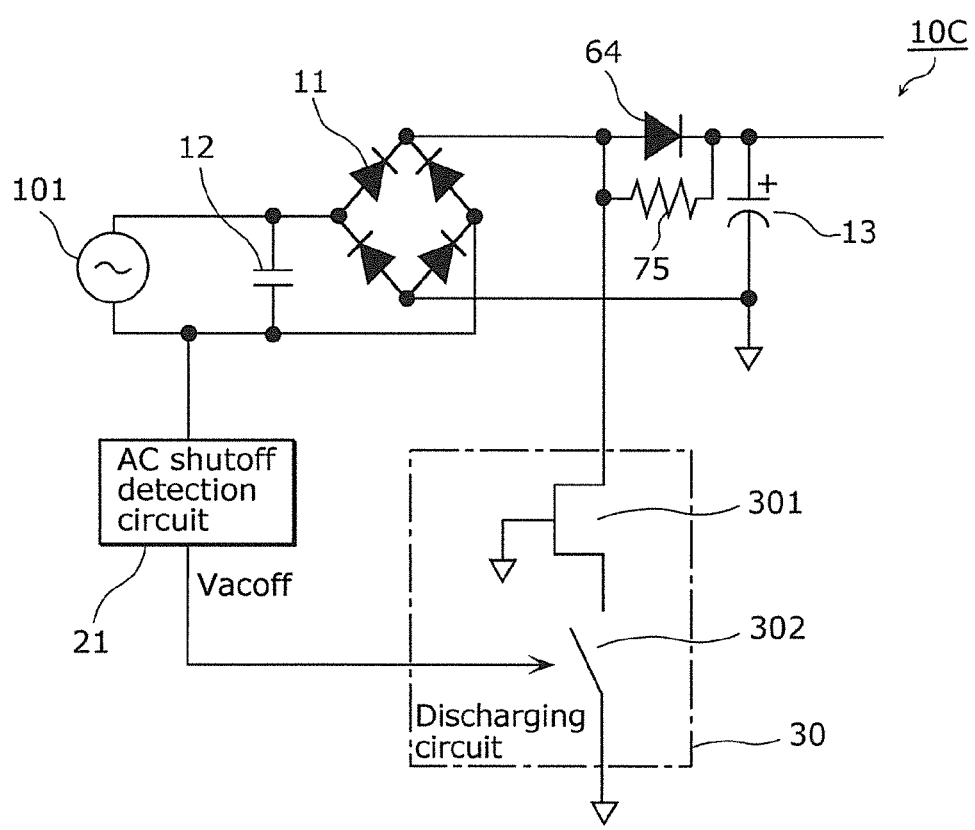
[FIG. 18]

FIG. 18 is a circuit diagram showing a configuration example of a converter according to Variation 2 of Embodiment 8. A converter 10C shown in this figure is different in structure from the converter 10A shown in FIG. 16 only in that the resistor 75 connected in parallel with the diode 64 is provided. Only the differences are described below, omitting descriptions of the same structures as the converter 10A shown in FIG. 16.

The resistor 75 is located between the point to which the discharging circuit 30 is connected and the positive electrode of the smoothing capacitor 13 on the DC voltage line, and is connected in parallel with the diode 64. The resistor 75 has a resistance of several tens of kilo-ohms (kΩ) to several mega-ohms (MΩ), for example.

While residual charges in only the X capacitor 12 are discharged in the converter 10A according to Embodiment 8, residual charges in the X capacitor 12 are preferentially discharged and residual charges in the smoothing capacitor 13 can also be discharged in the converter 10C according to this embodiment.

(Embodiment 9)

A converter according to Embodiment 9 is a converter which converts input AC voltage to a desired DC voltage and includes: a bridge diode which rectifies the input AC voltage; an across-the-line capacitor provided upstream of the bridge diode, for reducing a line noise; a smoothing capacitor which is provided downstream of the bridge diode and smoothes rectified voltage resulting from the rectification by the bridge diode; an AC shutoff detection circuit which "detects a shutoff of half-wave rectified AC voltage" and outputs an AC shutoff detection signal when the input AC voltage being applied to an input terminal is shut off; a first diode having an anode connected to one end of the across-the-line capacitor; a second diode having an anode connected to the other end of the across-the-line capacitor; and a discharging circuit which is connected to both a cathode of the first diode and a cathode of the second diode, and allows residual charges in at least one of the smoothing capacitor and the across-the-line capacitor to be discharged through the first diode and the second diode when the AC shutoff detection signal is output from the AC shutoff detection circuit, wherein the discharging circuit includes: a junction transistor which has a drain terminal connected to the above connection point and lowers discharge voltage that is voltage of the above residual charges being discharged; and a first discharging switch which is connected to a voltage-drop-side terminal, i.e., a source terminal, of the junction transistor and allows the above residual charges to be discharged.

Figure 19:
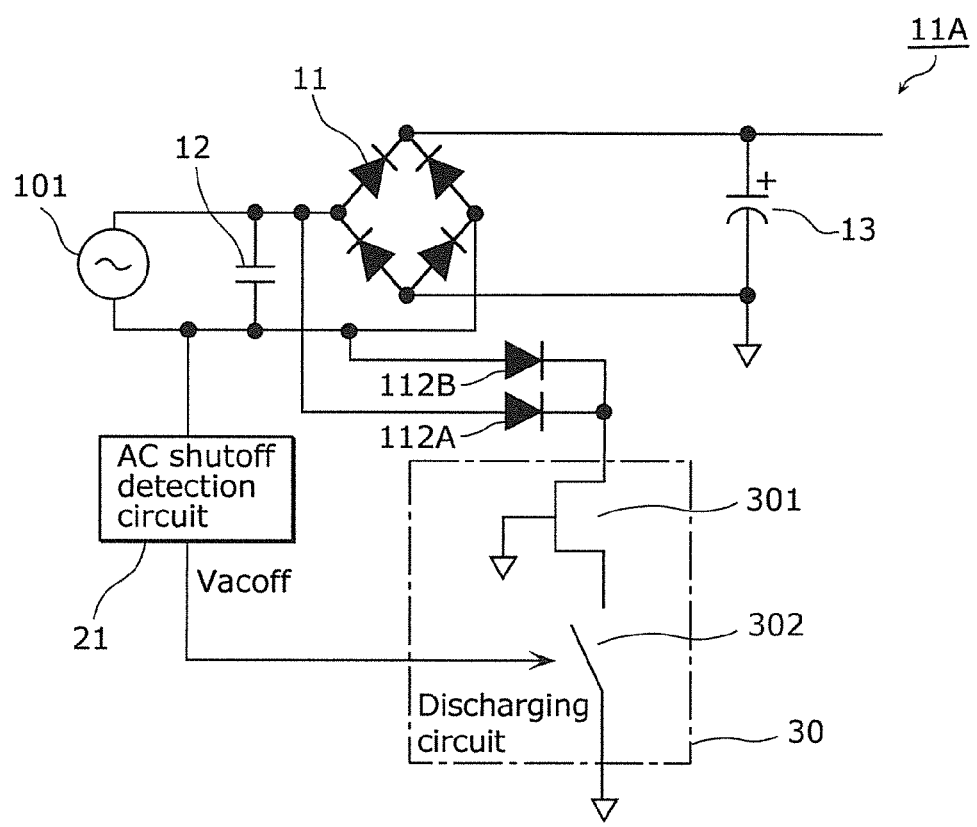
[FIG. 19]

FIG. 19 is a specific circuit diagram of a converter according to Embodiment 9. A converter 11A shown in this figure is different from the converter 10A shown in FIG. 16 in that diodes 112A and 112B are provided, that the connection point on the drain of the JFET 301 is the cathode of the diodes 112A and 112B, and that the diode 64 is no longer provided. Only the differences are described below, omitting descriptions of the same structures as the converter 10A shown in FIG. 16.

When the input AC voltage is shut off, residual charges in the X capacitor 12 are discharged from the discharging circuit 30 through the diodes 112A and 112B.

Furthermore, effects of Embodiment 9 are described. In the case of the converter 10A, current which flows through the diode 64 is small with the power circuit the power output of which is approximately several tens of watts, and generation of heat by the diode 64 is therefore not problematic. However, with power output of approximately 100 W, the current which flows through the diode 64 may be so large as to make the generation of heat by diode 64 problematic. In order to reduce this heat generation, it is necessary to take at least one measure, that is, mounting a radiator plate on the diode 64 or using the diode 64 the rated current of which is large. When the radiator plate is mounted on the diode 64, the mounting area increases and the cost also increases for the radiator plate. Higher rated current of the diode 64 means that the diode 64 is larger in size accordingly, and furthermore leads to higher diode cost.

Thus, instead of the above measures, the structure represented by the converter 11A can minimize the increases in cost and mounting area by only changing the connection of the discharging circuit when the power output is high.

Figure 20:
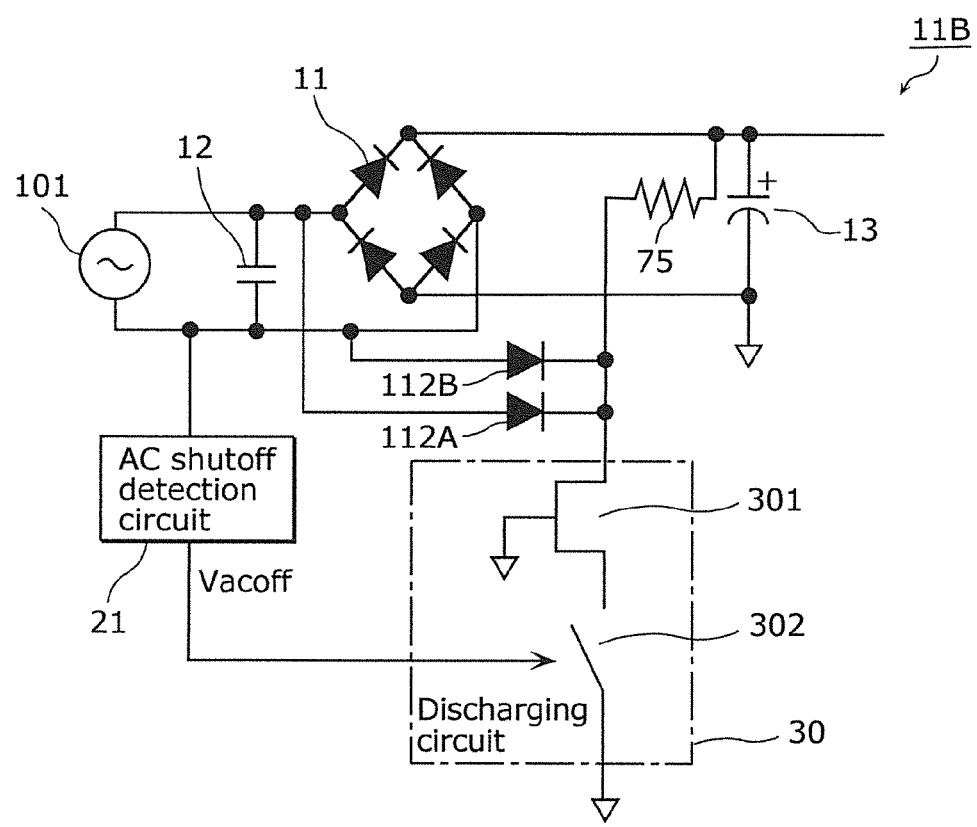
[FIG. 20]

FIG. 20 is a circuit diagram showing a configuration example of a converter according to Variation of Embodiment 9. A converter 11B shown in this figure is different in structure from the converter 11A shown in FIG. 19 only in that the resistor 75 is connected between the drain of the junction transistor and the cathode of the bridge diode. Only the differences are described below, omitting descriptions of the same structures as the converter 11A shown in FIG. 19.

The resistor 75 has one end connected between the bridge diode 11 and the positive electrode of the smoothing capacitor 13 and the other end connected to the cathodes of the diodes 112A and 112B. The resistor 75 has a resistance of several tens of kilo-ohms (kΩ) to several mega-ohms (MΩ), for example.

While residual charges in only the X capacitor 12 are discharged in the converter 11A according to Embodiment 9, residual charges in the X capacitor 12 are preferentially discharged and residual charges in the smoothing capacitor 13 can also be discharged in the converter 11B according to this variation.

The reason why the above preferential discharging is necessary is the same as in the converter 7 according to Embodiment 6.

Although the converters according to one or more aspect have been described above based on exemplary embodiments and variations thereof, the present inventive concept is not limited to these exemplary embodiments and variations. Those skilled in the art will readily appreciate that various modifications may be made in these exemplary embodiments and that other embodiments may be obtained by arbitrarily combining the structural elements of the embodiments without materially departing from the essence of the appended Claims, and the appended Claims are of a scope intended to cover and encompass these modified or combined embodiments.

For example, the scope of the appended Claims includes a structure obtained by replacing the input-output conversion unit 60 of the converters 2 to 4 according to Embodiments 2 to 4 with any one of the input-output conversion units 61 to 63 of the converters 1C to 1E according to Variations 2 to 4 of Embodiment 1, and such structure can produce the same or the like effects as those described above.

Furthermore, the scope of the appended Claims includes a converter obtained by replacing the AC shutoff detection circuit 21 with the AC shutoff detection circuit 20 described in any one of Embodiments 1 to 6, and such structure can produce the same or the like effects as those described above.

Furthermore, the scope of the appended Claims includes a semiconductor device which is included in the above converter according to any one of Embodiments 1 to 9 and includes: the AC shutoff detection circuit 20 which outputs an AC shutoff detection signal when the input AC voltage being applied to an input terminal is shut off; a discharging circuit which is connected to a connection point between a cathode of the bridge diode 11 and the smoothing capacitor 13, and allows residual charges in at least one of the smoothing capacitor 13 and the across-the-line capacitor to be discharged when the AC shutoff detection signal Vacoff is output from the AC shutoff detection circuit 20; a control circuit for adjusting the rectified DC voltage to a desired DC voltage; and a regulator which supplies power voltage to the control circuit, wherein the discharging circuit includes: a junction transistor 301 which lowers discharge voltage that is voltage of the residual charges being discharged; and a discharging switch which allows voltage resulting from the lowering by the junction transistor 301 to be discharged, and the junction transistor 301 has a voltage-drop-side terminal, i.e., a source terminal, connected to the regulator.

Furthermore, the scope of the appended Claims includes a semiconductor device which is included in the above converter according to any one of Embodiments 7 to 9 and includes: the AC shutoff detection circuit 21 which outputs an AC shutoff detection signal when the input AC voltage being applied to an input terminal is shut off; and a discharging circuit which is connected to a connection point between a cathode of the bridge diode 11 and the smoothing capacitor 13, and allows residual charges in at least one of the smoothing capacitor 13 and the across-the-line capacitor to be discharged when the AC shutoff detection signal Vacoff is output from the AC shutoff detection circuit 21; a control circuit for adjusting the rectified DC voltage to a desired DC voltage; and a regulator which supplies power voltage to the control circuit, wherein the discharging circuit includes: a junction transistor 301 which lowers discharge voltage that is voltage of the residual charges being discharged; and a discharging switch which allows voltage resulting from the lowering by the junction transistor 301 to be discharged, and the junction transistor 301 has a voltage-drop-side terminal, i.e., a source terminal, connected to the regulator.

Each processing unit included in the above semiconductor device is typically achieved in the form of an integrated circuit or a Large Scale Integrated (LSI) circuit. Each of these parts can be in plural single-function LSIs, or also can be in one integrated LSI. The name used here is LSI, but it may also be called IC, system LSI, super LSI, or ultra LSI depending on the degree of integration. Moreover, ways to achieve integration are not limited to the LSI, and special circuit or general purpose processor and so forth can also achieve the integration. Field Programmable Gate Array (FPGA) that can be programmed after manufacturing LSI or a reconfigurable processor that allows re-configuration of the connection or configuration of LSI can be used for the same purpose.

In the future, with advancement in semiconductor technology or other derivative technology, a brand-new technology may replace LSI. The integration of each processing unit can be carried out by that technology. Application of biotechnology is one such possibility.

Although the converters according to Embodiments 1 to 9 have each been described giving, as an example, a power conversion device which converts AC power to DC power with a desired DC voltage, a converter encompassed by the appended Claims is not limited to this power conversion device. The converter according to an exemplary embodiment is applicable as a light emitting diode (LED) drive the load of which is an LED and which supplies a desired DC voltage to the LED. Also in this case, the structure described in any one of Embodiments 1 to 9 is available, and the same or like effects as those described above can be produced.

The connection relationship between the structural elements has been illustrated to specifically explain the present inventive concept, which is therefore not a limited option of the connection relationship which achieves a function intended by the appended Claims.

Industrial Applicability

One or more exemplary embodiments disclosed herein are applied to a converter which is required to be reduced in size and cost while taking a measure for electric shocks, and are useful for AC-DC converters, power devices, LED drives, and so on.

The invention claimed is:

1. A converter which converts input alternating current (AC) voltage to direct current (DC) voltage, the converter comprising:
   a rectifier which has an anode terminal and a cathode terminal and rectifies the input AC voltage;
   an across-the-line capacitor provided upstream of the rectifier, for reducing a line noise;
   a smoothing capacitor which is provided downstream of the rectifier and smoothes rectified voltage resulting from the rectification by the rectifier;
   an AC shutoff detection circuit which outputs an AC shutoff detection signal when the input AC voltage being applied to an input terminal is shut off; and
   a discharging circuit which is connected to a first connection point, and allows residual charges in at least one of the smoothing capacitor and the across-the-line capacitor to be discharged when the AC shutoff detection signal is output from the AC shutoff detection circuit, the first connection point being a point at which the cathode terminal of the rectifier and the smoothing capacitor are connected,
   wherein the discharging circuit includes:
   a junction transistor which has a drain terminal connected to the first connection point and lowers discharge voltage that is voltage of the residual charges being discharged; and
   a first discharging switch which is connected to a source terminal of the junction transistor and, according to an output value of the AC shutoff detection signal, allows the residual charges to be discharged, the source terminal being a terminal on a voltage drop side.

2. The converter according to claim 1,
   wherein the rectifier is configured to half-wave rectify at least the input AC voltage, and
   the AC shutoff detection circuit detects the input AC voltage half-wave rectified by the rectifier and outputs the AC shutoff detection signal when the input AC voltage being applied to the input terminal is shut off.

3. The converter according to claim 1 or 2, further comprising
   a diode inserted in series between the first connection point and the smoothing capacitor where a forward direction is a direction from the first connection point toward the smoothing capacitor,
   wherein the AC shutoff detection circuit is connected upstream of the rectifier.

4. The converter according to claim 3, further comprising a resistor located between the first connection point and the smoothing capacitor and connected in parallel with the diode.

5. The converter according to claim 1, further comprising a diode inserted in series between the first connection point and the smoothing capacitor or between the cathode terminal of the rectifier and the first connection point where a forward direction is a direction from the cathode terminal of the rectifier toward the smoothing capacitor, wherein the AC shutoff detection circuit is connected to the cathode terminal of the rectifier.

6. The converter according to claim 5, wherein the diode is inserted between the first connection point and the smoothing capacitor, and the converter further comprises a resistor located between the first connection point and the smoothing capacitor and connected in parallel with the diode.

7. The converter according to claim 1 or 2, further comprising:
a switch element which turns on and off terminal voltage of the smoothing capacitor;
an input-output conversion unit configured to convert, to a desired DC voltage, the terminal voltage turned on or off by the switch element, and supply the DC voltage to a load;
a control circuit which controls the turning on and off of the switch element; and
a regulator which supplies power voltage to the control circuit,
wherein the source terminal of the junction transistor is connected to the regulator,
the first discharging switch has one end connected to the source terminal of the junction transistor and an other end connected to ground, and
the discharging circuit is grounded to allow the residual charges to be discharged through the junction transistor and the first discharging switch in a path independent of a current path extending from the regulator to the control circuit.

8. The converter according to claim 1 or 2, further comprising:
a switch element which turns on and off terminal voltage of the smoothing capacitor;
an input-output conversion unit configured to convert, to a desired DC voltage, the terminal voltage turned on or off by the switch element, and supply the DC voltage to a load;
a control circuit which controls the turning on and off of the switch element; and
a regulator which supplies power voltage to the control circuit,
wherein the source terminal of the junction transistor is connected to the regulator,
the regulator includes the first discharging switch and supplies power to the control circuit through the first discharging switch, and
the discharging circuit places the first discharging switch in a conductive state to allow the residual charges to be discharged.

9. The converter according to claim 8, wherein the first discharging switch is placed in the conductive state when a signal corresponding to the AC shutoff detection signal is applied to a gate of the first discharging switch.

10. The converter according to claim 8,
wherein the control circuit places the switch element in a non-conductive state when the AC shutoff detection signal is input, and
the first discharging switch is placed in the conductive state when the power voltage falls down to or below a reference voltage due to the non-conductive state of the switch element.

11. The converter according to claim 8,
wherein the discharging circuit further includes a second discharging switch between a grounded terminal and a second connection point at which the first discharging switch and the control circuit are connected,
the second discharging switch lowers the power voltage when placed in the conductive state by application of the AC shutoff detection signal to a gate of the second discharging switch, and
the first discharging switch allows the residual charges to be discharged when placed in the conductive state by the lowering of the power voltage.

12. The converter according to claim 1 or 2,
wherein the AC shutoff detection circuit outputs the AC shutoff detection signal when a time interval at which the input AC voltage rectified by the rectifier matches a positive referential voltage value exceeds a first preset time, and
the first preset time is set to be longer than a maximum value of the time interval at which the input AC voltage rectified by the rectifier matches the positive referential voltage value in a state where the input AC voltage exhibits stationary behavior.

13. The converter according to claim 12, wherein the first preset time is set to be shorter than a cycle length of the input AC voltage half-wave rectified by the rectifier.

14. The converter according to claim 13, wherein the AC shutoff detection circuit includes:
a voltage comparator which compares the positive referential voltage value and the input AC voltage rectified by the rectifier and outputs a comparison result signal;
a pulse generation circuit which outputs a pulse signal when the comparison result signal changes, the pulse signal having a pulse width of a second preset time; and
a timer circuit which has a timer state initialized by input of the pulse signal and outputs the AC shutoff detection signal after the first preset time has elapsed since the initialization.

15. A converter which converts input alternating current (AC) voltage to direct current (DC) voltage, the converter comprising:
a rectifier which has an anode terminal and a cathode terminal and rectifies the input AC voltage;
a rectifying element connected upstream of the rectifier and having an anode terminal and a cathode terminal;
an across-the-line capacitor provided upstream of the rectifier, for reducing a line noise;
a smoothing capacitor which is provided downstream of the rectifier and smoothes rectified voltage resulting from the rectification by the rectifier;
an AC shutoff detection circuit which is connected upstream of the rectifier, and detects the input AC voltage half-wave rectified by the rectifier and outputs an AC shutoff detection signal when the input AC voltage being applied to an input terminal is shut off; and
a discharging circuit which allows residual charges in the across-the-line capacitor to be discharged through the rectifying element when the AC shutoff detection signal is output from the AC shutoff detection circuit, wherein the discharging circuit includes:
a junction transistor which has a drain terminal connected to the cathode terminal of the rectifying element and lowers discharge voltage that is voltage of the residual charges being discharged; and
a first discharging switch which is connected to a source terminal of the junction transistor and, according to an output value of the AC shutoff detection signal, allows the residual charges to be discharged, the source terminal being a terminal on a voltage drop side.

16. A converter which converts input alternating current (AC) voltage to direct current (DC) voltage, the converter comprising:
a rectifier which has an anode terminal and a cathode terminal and rectifies the input AC voltage;
a rectifying element connected upstream of the rectifier and having an anode terminal and a cathode terminal;
an across-the-line capacitor provided upstream of the rectifier, for reducing a line noise;
a smoothing capacitor which is provided downstream of the rectifier and smoothes rectified voltage resulting from the rectification by the rectifier;
an AC shutoff detection circuit which is connected upstream of the rectifier, and detects the input AC voltage rectified by the rectifier and outputs an AC shutoff detection signal when the input AC voltage being applied to an input terminal is shut off;
a discharging circuit which allows residual charges in both the smoothing capacitor and the across-the-line capacitor to be discharged through the rectifying element when the AC shutoff detection signal is output from the AC shutoff detection circuit; and
a resistor serving as a discharging path for the residual charges in the smoothing capacitor,
wherein the discharging circuit:
is connected to the cathode terminal of the rectifying element;
is connected, via the resistor, to a first connection point at which the cathode terminal of the rectifier and the smoothing capacitor are connected; and
includes a first discharging switch which, according to an output value of the AC shutoff detection signal, allows the residual charges in both the smoothing capacitor and the across-the-line capacitor to be discharged.

17. The converter according to claim 16, wherein the AC shutoff detection circuit receives a signal obtained by the rectifier half-wave rectifying the input AC voltage.

18. The converter according to claim 17, comprising
a junction transistor which has a drain terminal connected to the cathode terminal of the rectifier and the resistor, and a source terminal connected to the first discharging switch.

19. The converter according to any one of claims 1, 2, 5, 15 and 16, further comprising:
a switch element which turns on and off terminal voltage of the smoothing capacitor;
an input-output conversion unit configured to convert, to a desired DC voltage, the terminal voltage turned on or off by the switch element, and supply the DC voltage to a load;
a control circuit which controls the turning on and off of the switch element; and
a regulator which supplies power voltage to the control circuit,
wherein the source terminal of the junction transistor is connected to the regulator.

20. The converter according to any one of claims 1, 2, 5, 15, and 16 wherein the AC shutoff detection circuit outputs the AC shutoff detection signal when a time interval at which the input AC voltage rectified by the rectifier matches a positive referential voltage value exceeds a first preset time.

\* \* \* \* \*